US012526886B2

(12) United States Patent
Otten

(10) Patent No.: US 12,526,886 B2
(45) Date of Patent: Jan. 13, 2026

(54) METHOD OF MULTI-MODE COLOR CONTROL BY AN LED DRIVER

(71) Applicant: eldoLAB Holding B.V., Son en Breugel (NL)

(72) Inventor: Andy Johanna Elisabeth Otten, Wassenberg (DE)

(73) Assignee: eldoLAB Holding B.V., Son en Breugel (NL)

( * ) Notice: Subject to any disclaimer, the term of this patent is extended or adjusted under 35 U.S.C. 154(b) by 140 days.

(21) Appl. No.: 18/283,492

(22) PCT Filed: Mar. 30, 2022

(86) PCT No.: PCT/EP2022/058441
§ 371 (c)(1),
(2) Date: Sep. 22, 2023

(87) PCT Pub. No.: WO2022/207720
PCT Pub. Date: Oct. 6, 2022

(65) Prior Publication Data
US 2024/0155747 A1    May 9, 2024

(30) Foreign Application Priority Data
Mar. 31, 2021  (NL) ..................... 2027881

(51) Int. Cl.
*H05B 45/20*   (2020.01)
*H05B 45/48*   (2020.01)

(52) U.S. Cl.
CPC ............. *H05B 45/20* (2020.01); *H05B 45/48* (2020.01)

(58) Field of Classification Search
CPC ........ H05B 45/10; H05B 45/14; H05B 45/18; H05B 45/20; H05B 45/24; H05B 45/28;
(Continued)

(56) References Cited

U.S. PATENT DOCUMENTS 7,315,139 B1   1/2008  Selvan et al.
9,241,384 B2   1/2016  van de Ven et al.
(Continued)

FOREIGN PATENT DOCUMENTS

WO   2008139369 A1   11/2008

OTHER PUBLICATIONS

International Search Report and Written Opinion for International Application No. PCT/EP2022/058441, dated Jun. 17, 2022, 12 pages.
(Continued)

*Primary Examiner* — Long Nguyen
(74) *Attorney, Agent, or Firm* — Sikand IP Law PLLC

(57) ABSTRACT

Method of controlling an LED fixture comprising a plurality of LEDs, the plurality of LED comprising at least four LEDs, configured to emit light of different colors, the method comprising:
receiving a set point representing a desired color and intensity for the light to be generated by the LED fixture;
determining, based on available color characteristics of the plurality of LEDs, at least two different subsets of the plurality of LEDs and a set of intensity set points for each of the at least two different subsets, wherein each set of intensity set points results in obtaining or approximating the desired color and intensity by the LED fixture;
selecting the subsets of the plurality of LEDs with the corresponding sets of intensity set points which meet a predetermined criterion;
use a selected subset to drive the plurality of LEDs with the corresponding set of intensity set points.

32 Claims, 14 Drawing Sheets

(58) Field of Classification Search
CPC .... H05B 45/30; H05B 45/37; H05B 45/3725; H05B 45/375; H05B 45/38; H05B 45/40; H05B 45/44; H05B 45/46; H05B 45/48
See application file for complete search history.

(56) References Cited

U.S. PATENT DOCUMENTS

| | | | |
|---|---|---|---|
| 9,560,714 B1 | 1/2017 | Hjerde | |
| 11,140,759 B2* | 10/2021 | Otten | H05B 45/46 |
| 12,009,860 B2* | 6/2024 | Saes | H04B 10/116 |
| 2013/0207570 A1 | 8/2013 | Bergeler et al. | |
| 2019/0271594 A1 | 9/2019 | Yao | |

OTHER PUBLICATIONS

Netherlands Search Report and Written Opinion for Netherlands Application No. 2027881, dated Feb. 14, 2022 with partial translation, 11 pages.

Second Written Opinion of the International Preliminary Examining Authority for International Application No. PCT/ EP2022/058441, mailed Mar. 17, 2023, 8 pages.

International Preliminary Report on Patentability for International Application No. PCT/EP2022/058441, dated Jun. 29, 2023, 8 pages.

* cited by examiner

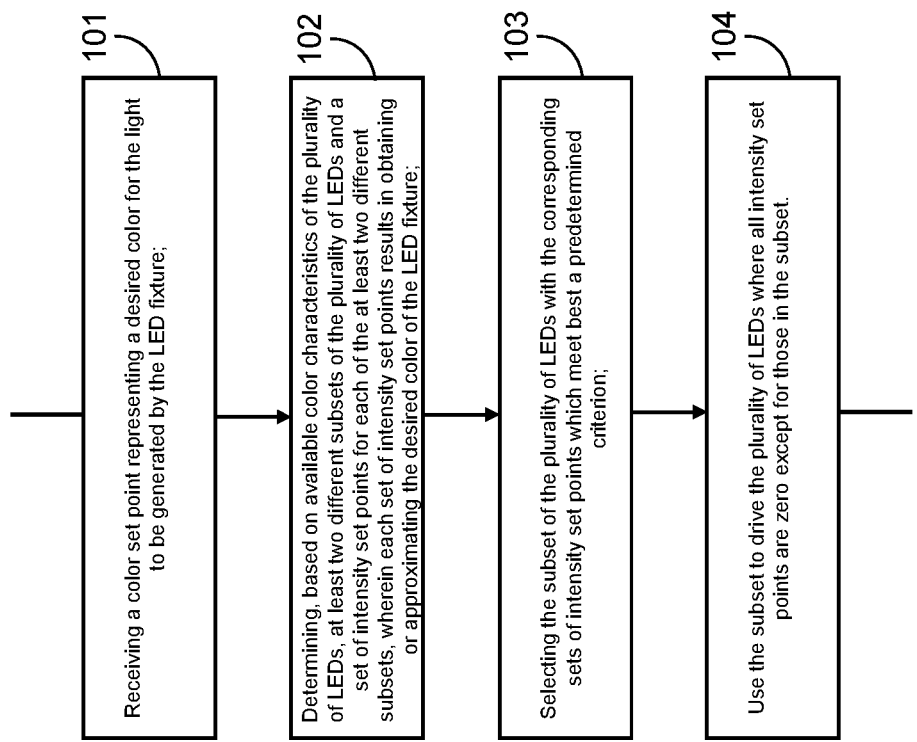

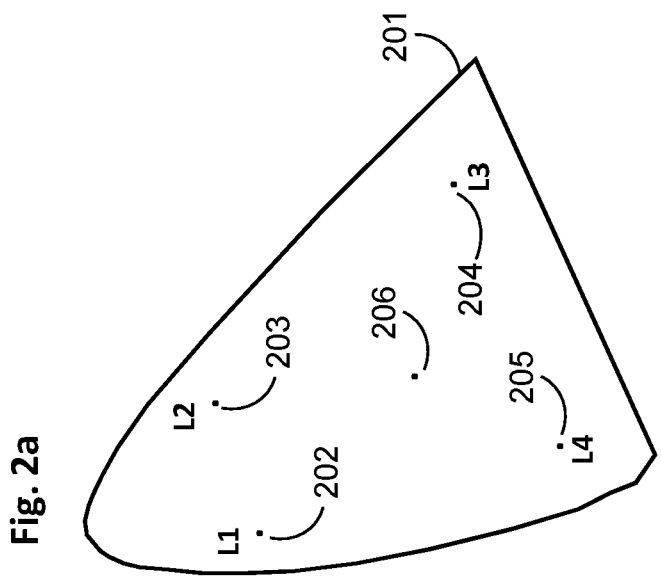

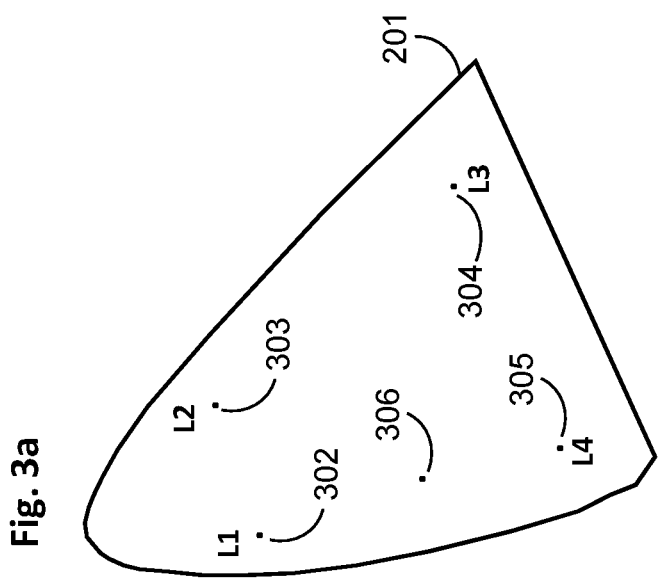

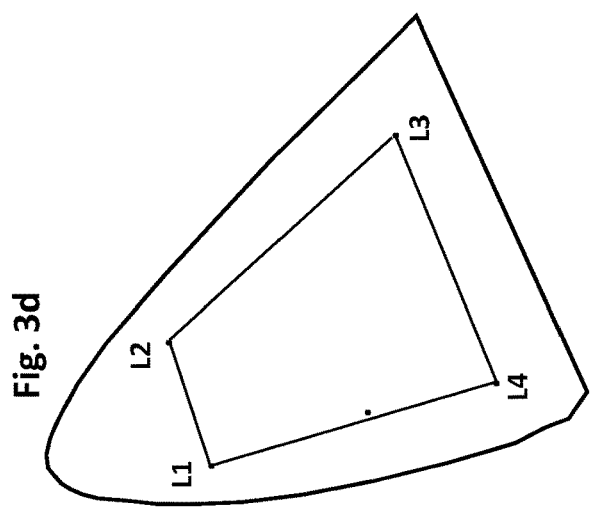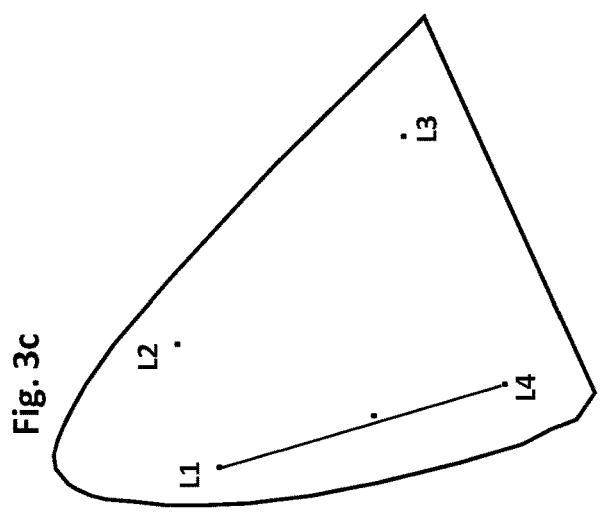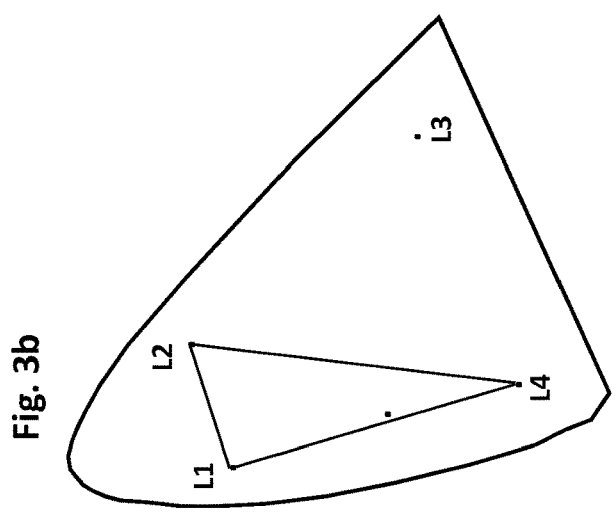

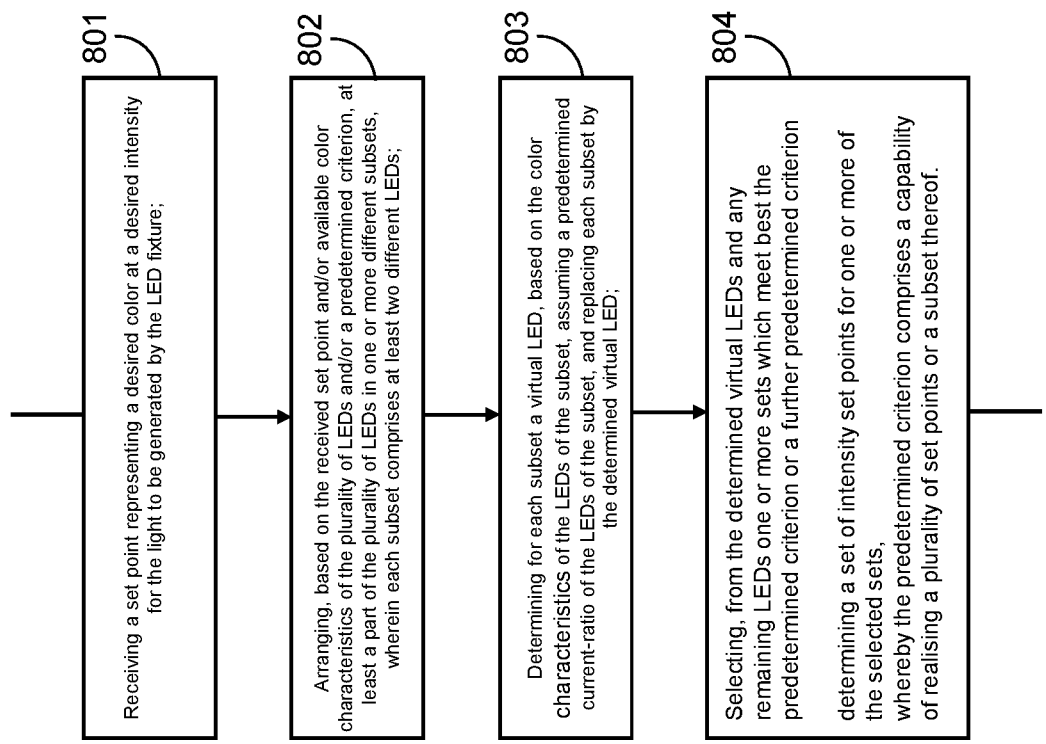

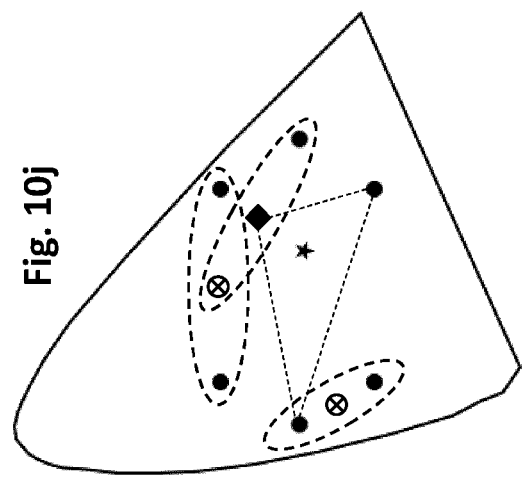
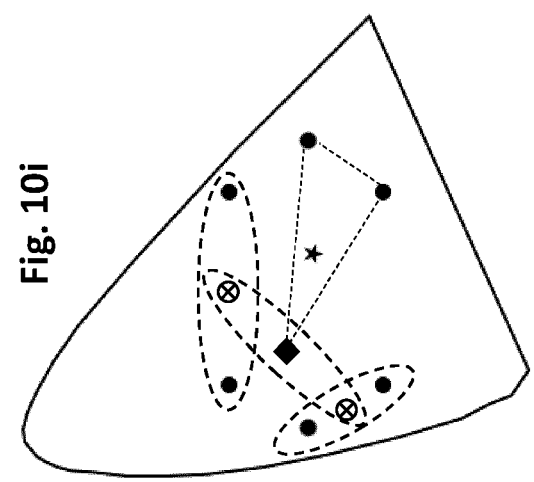
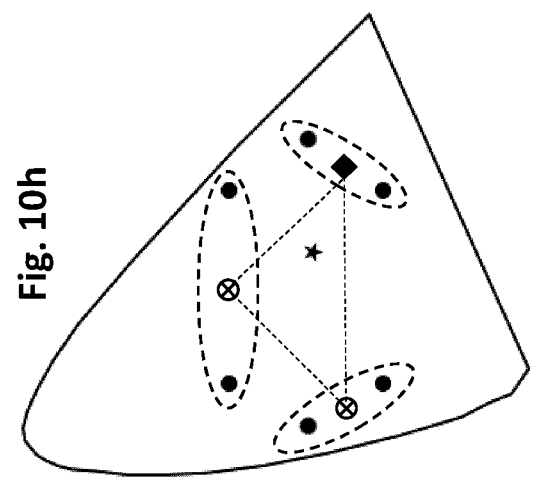

METHOD OF MULTI-MODE COLOR CONTROL BY AN LED DRIVER

CROSS-REFERENCE TO RELATED APPLICATIONS

This application is a U.S. National Phase filing of International Application No. PCT/EP2022/058441, filed Mar. 30, 2022, which claims priority to Netherlands Application No. NL 2027881, filed Mar. 31, 2021. The disclosures of these applications are incorporated herein by reference in their entirety for all purposes.

BACKGROUND

The technical field of the present invention relates to illumination systems using Light Emitting Diodes (LEDs).

At present, conventional lighting applications are more and more replaced by illumination systems using LEDs. LEDs have several advantages over incandescent lighting, such as higher power to light conversion efficiency, faster and more precise lighting intensity and color control by controlling a current flowing though the LEDs.

In general, an LED based illuminating application comprises a plurality of LEDs and an LED driver for powering the LEDs by providing the current through the LEDs. Such an LED driver in general comprises a power converter such as a switched mode power supply (e.g. Buck or Boost converter) and a control unit for controlling the power converter. Based on the color characteristics of the plurality of LEDs applied, a color gamut, i.e. a collection or set of colors that can be generated by the plurality of LEDs, can be defined. Such a color gamut can e.g. be represented in a color space.

For a long time, LED based illumination devices have applied LED sets that generate three primary colors, usually red, green and blue. These primary colors thus define the color gamut, i.e. the set of colors that can be generated. Introducing more LEDs, a wider color gamut is possible, but this leads to higher complexity and cost. In particular, when more than three LEDs or LED groups are present, it may no longer be possible to calculate one single gamut to reach a desired color point, when the color point is in an overlapping area of two or more gamuts. In such arrangement, an infinite number of solutions is possible to arrive, based on the color characteristics of the LEDs, at the desired color point. Further, it can be mentioned that power consumption is an important issue in illumination systems and thus many activities are ongoing to decrease the power consumption. It would be desired to have an efficient and straightforward manner of determining how to generate a desired color characteristic for an LED based illumination devise that has more than three different LEDs or LED groups.

SUMMARY OF THE INVENTION

It is an object of the invention to provide a method of controlling an LED fixture comprising a plurality of LEDs. In particular, in accordance with the present invention, the plurality of LEDs comprises at least four different LEDs or LED groups, wherein each LED or LED group has a different color, as e.g. characterised in a color space. It is an object of the present invention to efficiently determine how to control the plurality of LEDs in such manner that the plurality of LEDs, or a subset thereof, emit light of different colors in a manner to reach a desired color and a desired intensity.

In order to achieve this or other goals, the invention provides a first method comprising:
- receiving a set point representing a desired color and a desired intensity of the light to be generated by the LED fixture;
- determining, based on available color characteristics of the plurality of LEDs, at least two different subsets of the plurality of LEDs and a set of intensity set points for each of the at least two different subsets, wherein each set of intensity set points results in obtaining or approximating the desired color and the desired intensity by the LED fixture;
- selecting the subsets of the plurality of LEDs with the corresponding sets of intensity set points which meet a predetermined criterion.

The first method according to the invention comprises the step of receiving a set point, the set point comprising a desired color and a desired intensity of the light to be generated by the light fixture. The LED fixture may e.g. comprise a plurality of LEDs. The plurality of LEDs comprises at least four different LEDs. The plurality of LEDs of the LED fixture may e.g. be arranged in one or more strings, thus forming a series connection of LEDs, and/or may be arranged in a parallel connection. The set point as received may e.g. be a mathematical description of the desired color and the desired intensity in a color space (e.g. the CEI Yxy color space, wherein xy are the chromaticity coordinates of the desired color and Y represents the overall intensity). In particular, the set point represents the desired color and intensity in a color space. The color space is a specific organization of colors, for example the CIE 1931 color space, which can be visualised in a chromaticity diagram.

When a plurality of LEDs are provided in an LED fixture, the LEDs e.g. having different color characteristics, the LED fixture will generate a resulting color when each of the plurality of LEDs or a subset of the LEDs is configured to generate light with a particular intensity. The intensity of each of the LEDs may e.g. be characterised by an intensity set point. As such, a set of intensity set points associated with a particular subset of the plurality of LEDs may characterize the intensities of the subset of LEDs that, when applied, result in the obtaining or approximating of the desired color at the desired intensity, as represented by the set point. The set of intensity set points of the corresponding subset of the plurality of LEDs represents the mathematical description of the intensities of the LEDs to obtain or approximate the desired color and intensity in the color space. In particular, the set of intensity set points of the corresponding subset of the plurality of LEDs represents the obtained or approximated desired color and intensity in the color space.

In the first step of the first method according to the invention, the receiving of a set point representing a desired color at a desired intensity for the light to be generated by the LED fixture, is established. Such set point may e.g. be a co-ordinate in the CEI color space of the desired color with a corresponding intensity value. Typically, both characteristics, i.e. color and intensity, can be regulated or controlled separately during operation. For example, in addition to a color set point, there could be an intensity set point, representing a desired intensity or dimming value of the desired color.

After receiving the set point by the LED fixture, the first method according to the invention comprises a second step of determining, based on available color characteristics of the plurality of LEDs, at least two different subsets of the plurality of LEDs, and a set of intensity set points for each of the at least two different subsets, wherein each set of intensity set points, when applied, results in obtaining or approximating the desired color at the desired intensity by the LED fixture. The available color characteristics of the plurality of LEDs provides information about each LED or LED unit of the LED fixture. The available color characteristics may in particular comprise information that enables to determine a co-ordinate in a color space for the LEDs. The determination step of the method according to the invention is to determine those subsets of the plurality of LEDs which sufficiently obtain or approximate the desired color at the desired intensity, as represented by the set point. The term 'sufficiently' indicates that an error margin between the color as obtained by the application of a particular set of intensity set points and the set point should e.g. be minimal. The error margin may e.g. be defined as a chromaticity distance between a first co-ordinate in a color space of the obtained or approximated desired color and intensity by the set of intensity set points of the corresponding subset of the plurality of LEDs and a second chromaticity co-ordinate in the color space of the desired color and intensity. The general definition of the chromaticity distance in a particular color space is the difference or distance between two colors in a chromaticity diagram. As most definitions of color distance are distances within a color space, the standard means of determining distances is the Euclidean distance. However, there are a number of formulae to calculate the chromaticity distance. The available color characteristics may further comprise e.g. the LED color rendering index (CRI), LED spectrum, LED chromaticity, LED color stability etc. The CRI value refers to a quantitative measure of the ability of a light source to reveal the colors of various objects faithfully in comparison with an ideal or natural light source. Further, a subset of the plurality of LEDs comprises at least one LED unit of the LED fixture.

When the different subsets of the plurality of LEDs with the corresponding sets of intensity set points are determined, the third step of the first method according to the invention provides the selection of the subsets of the plurality of LEDs with the corresponding sets of intensity set points which meet a predetermined criterion. The predetermined criterion may be chosen from a large variety of criteria or constraints and can be considered as a second requirement that needs to be fulfilled by a particular subset of the plurality of LEDs to be selected.

In an embodiment, the first method according to the invention further comprises the steps of selecting the subset of the plurality of LEDs with the corresponding sets of intensity set points which meet best the predetermined criterion and using the selected subset to drive the plurality of LEDs with the corresponding set of intensity set points. In an embodiment, meeting best a predetermined criterion may include maximising or optimising the criterion. As such, the selection may involve selecting a subset for which the criterion reaches has a maximum or optimum value. When two or more subsets fulfils the predetermined criterion, e.g. having a CRI value of 80 or more, the subset with the highest CRI value can be selected.

In an embodiment, the predetermined criterion of the first method according to the invention may comprise e.g. a CRI value of the sets of intensity set points of the corresponding subsets of the plurality of LEDs, whereby said CRI value may e.g. be maximized by the selection, and/or an efficiency value of the sets of intensity set points of the corresponding subsets of the plurality of LEDs, which efficiency value may be maximized by the selection, and/or a lifetime value of the sets of intensity set points of the corresponding subsets of the plurality of LEDs, which lifetime value is maximized and/or a sensitivity value of the sets of intensity set points of the corresponding subsets of the plurality of LEDs, which sensitivity value is minimized. Furthermore, in an embodiment the predetermined criterion of the first method according to the invention comprises a desired intensity value, wherein the selecting step of the method comprises selecting the set of intensity set points of the corresponding subset of the plurality of LEDs with an intensity value, which intensity value meets best the predetermined criterion. In an alternative embodiment, the predetermined criterion is a weighted combination of the CRI value and/or efficiency value and/or lifetime value and/or intensity value and/or sensitivity value, which weighted combination is optimized. The sensitivity value is the ratio of the deviation of the intensity over the deviation of the current. A high sensitivity value means a high intensity shift upon a current variation, which is undesirable.

In an embodiment, the determining step of the first method according to the invention comprises an algorithm to calculate e.g. for each subset the set of intensity set points based on the available color characteristics of the LEDs and the set point.

In an embodiment, the first method according to the invention comprises a chromaticity distance between a first co-ordinate in a color space representing the obtained or approximated color by the set of intensity set points of the corresponding subset of the plurality of LEDs and a second chromaticity co-ordinate in the color space representing the desired color, which chromaticity distance (e.g. the distance metric of CIE, i.e. ΔE76) is smaller than 2, preferably the chromaticity distance is smaller than 1. For example, the chromaticity distance may be calculated in the CEI color space for each set of intensity set points of the corresponding subset of the plurality of LEDs, which meets the predetermined criterion. An alternative, are the MacAdam steps SDCM (standard deviation for color matching), which define the size of a MacAdams Ellipse in a color space. Preferably the SDCM is smaller than 3, more preferably smaller than 2.

In an embodiment, the determination step of different subsets according to the first method of the invention is directed at choosing only subsets of maximal three LEDs. Thus, each subset comprises three LEDs or less. In this situation, the determination of the set of intensity set points for each subset is a straightforward calculation as there is only one solution.

The first method according to the invention enables to control or regulate a plurality of LEDs in an optimized manner to obtain or approximate the desired color at the desired intensity. This may be demonstrated by an example. Suppose that the LED fixture comprises four LEDs: a red LED, a green LED, a first blue LED and a second blue LED. The desired color, represented by a set point, is a color composed of 25% red, 70% green and 5% blue and with an emitted light intensity by the LED fixture of 80% of the maximal light intensity (i.e. the intensity reached when a maximal current is provided to all the LEDs). The maximal current need not be the same as the nominal current. Typically, the nominal current is the current which can continuously flow through an LED and which causes the LED to operate at a desired operating temperature or within a certain temperature range, so as to ensure a certain desired lifetime of the LED, e.g. expressed in illumination hours. In this example, multiple different subsets of the plurality of LEDs can be determined: e.g. a first subset composed of the red LED, the green LED and the first blue LED or a second subset composed of the red LED and the green LED or a third subset composed of the red LED and the second blue LED etc. For each subset, a set of intensity set points may be determined that results in the desired color, e.g. the second subset composed of the red LED and green LED may have an associated set of intensity set points with an intensity percentage of 25% of the red LED and an intensity percentage of 75% of the green LED. The intensity percentage is defined with respect to the nominal current or more specifically, there is an intensity percentage of 100% when nominal current is flowing. Further, the predetermined criterion may comprise an CRI value (e.g. 70). In this example, assume that only two subsets of the plurality of LEDs with the corresponding sets of intensity set points meet the predetermined criterion, namely the second subset, having a CRI value of 78, with the corresponding set of intensity set points, e.g. an intensity percentage of 25% of the red LED and an intensity percentage of 75% of the green LED, and the first subset, having a CRI value of 71, with the corresponding set of intensity set points, e.g. an intensity percentage of 25% of the red LED, an intensity percentage of 74% of the green LED and an intensity percentage of 1% of the first blue LED.

In an advantageous embodiment, the method according to the invention further comprises the selection of the subset of the plurality of LEDs with the corresponding set of intensity set points which meets best the predetermined criterion. The method may further comprise the usage of the set of intensity set points of the corresponding selected subset of the plurality of LEDs to the plurality of LEDs of the LED fixture to obtain or approximate the desired color at the desired intensity. Applied to the aforementioned example, the second subset with the corresponding set of intensity set points may meet best the predetermined criterion, i.e. the second subset with the corresponding set of intensity set points pertains to the highest CRI value which obtains or approximates the desired color and intensity in the most optimal manner.

In an embodiment, the method according to the invention further comprises the selection of the set of intensity set points of the corresponding subset of the plurality of LEDs with a minimal number of LEDs, when at least two different sets of intensity set points of the corresponding subsets of the plurality of LEDs meet the predetermined criterion.

The first method according to the invention enables to control or regulate a plurality of LEDs in an optimized manner to obtain or approximate the desired color. This may be demonstrated by an example. Suppose that the LED fixture comprises six LEDs: a red LED (R), a green LED (G), an blue LED (B), a warm white LED (WW), a natural white LED (NW) and a cold white LED (CW). Remark that the latter three LEDs are located on the Planckian locus or black body locus in the CIE chromaticity diagram. This locus is visualised by a curve in the CIE chromaticity diagram and this curve visualises the path that the color of a black body takes as the blackbody temperature changes.

In the first situation, the set point, representing a desired color at a desired intensity, is located further away from the black body locus. In this easy example, the second method according to the invention arranges for example the six LEDs into two different subsets: one subset comprises the RGB gamut and the second subset comprises the WW, NW and CW LEDs gamut. If the chromaticity distance ΔE76 between the color point and the Planckian locus is larger than two, then the RGB gamut is selected. Otherwise, if the chromaticity distance is smaller than two, the WW, NW and CW is selected.

The objective of purpose to select a subset of a plurality of LEDs is first of all to facilitate the control of the plurality of LEDs. By selecting only a subset of the plurality of LEDs, the number of control variables like current, duty cycle is reduced, thus enabling a faster calculation of the control variables that need to be applied in order to arrive at the desired illumination set point.

In accordance with the present invention, various criteria can be applied to arrive at the suitable selection of LEDs or subsets of LEDs out of the plurality of LEDs to obtain the desired color at a desired intensity. Examples are e.g. an optimization of the operational efficiency, or the accuracy at which the illumination set point is obtained. Other criteria to arrive at a suitable selection can e.g. be based on a CRI of the selected set.

Yet another advantageous criterion can be the capability of a selected set to reduce or minimize flicking or flicker. By selecting the right or set of LEDs or combination of LEDs one can avoid or mitigate occasions where a large difference is power is required. If, for example, a set of 3 LEDs is selected, whereby 1 LED is located much closer to the target point in the CIE map than the 2 other LEDs, this LED will require much less power compared to the other 2. In case a power to an LED is controlled by controlling the duty cycle of a supply current, said LED would be operated at a low duty cycle compared to the other LED. Alternatively, the 2 remote LEDs need to be operated at a comparatively high current, whereas the LED that is located close to the target point in the CIE map or diagram would need to be operated at a low current. In case the LEDs are alternatingly supplied by the same current source, this could lead to high currents for the two LEDs & a low current for the other. When considering the power profile over time for such an arrangement, there would be a large power variation; there would be 'gaps' over time in the power consumption of the LED fixture. These gaps have a negative influence on the 'flicker' index. If a specific combination of LEDs allows minimizes the size of these 'jumps' in power over time, this would have a positive effect on the measured flicker.

Other criteria may e.g. involve taking account of a plurality of set points rather than a particular set point.

An embodiment of the method according to the first aspect of the invention that takes account of the feasibility of realizing multiple set points in the most advantageous manner, taking account of a particular criterion can be described as follows:

In an embodiment, the present invention provides a method comprising:
  receiving a plurality of set points, each representing a desired color and a desired intensity of the light to be generated by the LED fixture;
  determining, based on available color characteristics of the plurality of LEDs, at least two different subsets of the plurality of LEDs and a set of intensity set points for each of the at least two different subsets, wherein each set of intensity set points results in obtaining or approximating the desired color and the desired intensity of one or more of the plurality of set points by the LED fixture;
  selecting the subsets of the plurality of LEDs with the corresponding sets of intensity set points which meet a predetermined criterion, whereby the predetermined criterion comprises a capability of realising the plurality of set points.

In such embodiment, the selection of the most suitable subgroup involves assessing or evaluating the predetermined criterion for different set points, e.g. a range of set points. As will be appreciated, in case the LED fixture is intended to be used for different set points, e.g. different color set points and/or different intensity set points, these different set points can e.g. be described as a discrete set of different set points or as a range of set points. In the former case, the criterion applied to determine or select the most suitable subset can involve the selection of the subgroup which can realise the largest number of set points of the different set points. In case the different set points are described or defined as a range, the criterion may e.g. to select the subgroup which encompasses the desired or required range entirely or which encompasses the range in the best possible manner.

In case the different set points are different color set points, the different color set points can e.g. be represented in a CEI diagram. The selection of the most suitable subset of LEDs may result in the selection of the subset who's gamut contains all different color set points.

In an embodiment, the different set points are set points with the same color but with a different intensity. Such a set or range of different set points can be considered a dimming range, whereby the LED fixture is configured to generate illumination at a particular color set point at different intensity levels.

In case the required or desired intensity corresponds to an intensity range, also referred to as a dimming range, it may be desirable that the dimming range can be realised using the same subset of LEDs. By doing so, a smooth transition between different dimming levels can be obtained. In case one would have to switch from one subset to another subset, this may cause an undesirable visible transient. At the same time, it may be desirable to maintain the same color set point throughout the entire dimming range.

As such, in an embodiment of the present invention, the criterion applied to select the most appropriate subset involves assessing to what extend the subsets are capable of realising a predetermined desired dimming range, optionally while maintaining substantially the same color set point.

Such an assessment can e.g. involve determining whether each LED or LED group in the subset can be provided with the required current across the entire dimming range. In particular, it can be assessed or checked whether or not a desired intensity, corresponding to an intensity in the dimming range, can be realised within the boundaries of the currents that can be supplied by the LED driver. It may for example occur that, a high intensity part of a desired dimming range cannot be realised using a particular subset, because this would require the supply current for one or more LEDs of the subset to be higher than a predetermined maximum current, said predetermined maximum current e.g. corresponding to the nominal current or a maximum current based on temperature constraints or life-time constraints. Using such constraints, it may thus occur that certain subsets of the plurality of LEDs as selected, may only be capable of generating a part of portion of the desired dimming range, e.g. up to a particular intensity but not beyond.

It can further be pointed out that at the lower end of a dimming range, where a comparatively low intensity of illumination is required, issues may arise as well. In order to accurately generate a low intensity illumination, the currents as supplied to the LEDs and/or the duty cycle as applied for said currents needs to be comparatively low. Typically, current levels and duty cycles may be difficult to adjust in a continuous manner. Rather, they can be adjusted in a discrete manner with a particular given resolution. As a result of this, desired or required intensities at the lower end of a desired dimming range may be difficult or impossible to achieve. In case a current or duty cycle can only be adjusted in a discrete manner, this may adversely affect the capabilities of attaining very low intensity levels, or maintaining a desired color set point for said intensity levels.

As such, the different subsets of LEDs as selected may also be ranked with respect to their capabilities of realising intensity levels at the lower end of a desired dimming range.

In an embodiment of the present invention, a subset of LEDs can be selected based on its capabilities to realise a high-intensity portion of a desired dimming range, based on its capabilities to realise a low-intensity portion of a desired dimming range, or a combination thereof.

In an embodiment of the present invention, a subset of LEDs is selected which can realise the largest portion of a desired dimming range.

In yet another embodiment, rather than selecting a subset of LEDs suitable to realize a required dimming range, one can select a first subset of LEDs suitable to realize a first portion of a required dimming range and a second subset of LEDs suitable to realize a second portion of the required dimming range, whereby the first portion at the second portion at least partially overlap and, when combined, overlap the entire required dimming range.

In an embodiment, there may be various options to select such a first subset, realizing a first portion of a required dimming range, and a second subset, realizing a second portion of a required dimming range.

In such case, it may be advantageous to apply a further criterion to select the most suitable first subset and second subset. Such a criterion can e.g. be the CRI of the light generated by the subsets.

It can also be pointed out that the subsets as selected may have one or more LEDs in common.

The invention provides a second method of controlling an LED fixture comprising a plurality of LEDs, the plurality of LEDs comprising at least four LEDs, configured to emit light of different colors, the second method comprising:

a) receiving a set point representing a desired color at a desired intensity for the light to be generated by the LED fixture;

b) arranging, based on the received set point and/or available color characteristics of the plurality of LEDs and/or a predetermined criterion, at least a part of the plurality of LEDs in one or more different subsets, wherein each subset comprises at least two different LEDs;

c) determining for each subset a virtual LED, based on the color characteristics of the LEDs of the subset, assuming a predetermined current-ratio of the LEDs of the subset, and replacing each subset by the determined virtual LED;

d) selecting, from the determined virtual LEDs and any remaining LEDs a set which meets best the predetermined criterion or a further predetermined criterion.

The second method according to the invention comprises a first step of receiving a set point, the set point representing a desired color at a desired intensity for the light to be generated by the LED fixture. In an embodiment, the set point may also be a set point range, a range of set point, a set, group or array of set points.

After receiving the set point, or set point range by the LED fixture, the second method according to the invention comprises a second step of arranging, based on the received set point and/or available color characteristics of the plurality of LEDs and/or a predetermined criterion, at least a part of the plurality of LEDs in one or more different subsets, wherein each subset comprises at least two different LEDs. The predetermined criterion may be chosen from a large variety of criteria or constraints (e.g. CRI value) and can be considered a requirement that needs to be fulfilled.

The next step of the second method according to the invention determines for each subset a virtual LED, based on the color characteristics of the LEDs of the subset, assuming a predetermined current-ratio of the LEDs of the subset, and replacing each subset by the determined virtual LED. In this step of the second method according to the invention, an LED characteristic of an LED, referred to as the virtual LED, is construed, based on the color characteristics of the LEDs of the subset and under the assumption that the LEDs of the subset will be supplied with a current or currents have a predetermined current-ratio. As an example, the current ratio can be 1. In such case, the LEDs of the subset of LEDs are thus assumed to be supplied with the same current or currents with the same amplitude or duty cycle. When a predetermined current-ratio is assumed, the color characteristic of the virtual LED can e.g. be construed based on the color characteristics of the LEDs of the subset, said color characteristics e.g. including a location in the CIE diagram or in a color space. The virtual LED can then be used in lieu of the physical LEDs in the calculations. With this step the number of unknown control variables decreases. The predetermined current-ratio of the LEDs of the subset can lie between 0 and 100%. A current-ratio of 100% means that the LEDs of the subset are provided with the same current or currents with the same amplitude or duty cycle.

In the last step of the second method, a set of the determined virtual LEDs and any remaining LEDs is selected which meets best the predetermined criterion or a further predetermined criterion. The further predetermined criterion may be chosen from a large variety of criteria or constraints (e.g. efficiency value) and can be considered a requirement that needs to be fulfilled. In an embodiment, the criterion or the further criterion as applied is the capability of the selected set to provide the desired color and intensity across a predetermined range or for a plurality of different set points In such embodiment, the set point received in step a can e.g. be a set point range describing a desired range of colors and associated intensities that are to be generated by the LED fixture.

In such embodiment, the last step of the second method according to the invention can further comprise:
  determining a set of intensity set points for one or more of the sets,
  whereby the predetermined criterion comprises a capability of realising a plurality of set points or a subset thereof.

In an embodiment, the steps b-d of the second method according to the invention are repeated, using the virtual LEDs and remaining LEDs as the plurality LEDs, until the sum of virtual LEDs and remaining LEDs is three. Once there are only three LEDs remaining, the required currents to arrive at a desired set point can be easily determined. The calculation is straightforward, because there is only one solution possible.

In an embodiment, the steps b-c of the second method are repeated a plurality of times, whereby different arrangements of at least a part of the plurality of LEDs in one or more different subsets are considered, each subset comprises at least two different LEDs.

As will be appreciated, there are various manners to group a plurality of LEDs, or part thereof, into subsets of LEDs which subsets can then be considered or operated as a single 'virtual' LED.

In an embodiment of the present invention, several of such arrangements, are considered. Each of these arrangements may e.g. result in a set of virtual LEDs and remaining LEDs, i.e. LEDs of the plurality of LEDs that are not part of any subset. Such a set may then be evaluated using a predetermined criterion or a further predetermined criterion. As an example, the arrangements of LEDs in subsets can e.g. be based on the criterion that the resulting illumination has a certain, predetermined CRI value.

As another criterion, as already discussed above, the capability of generating illumination with a comparatively low flicker-index can be mentioned.

It may occur that various arrangements of the plurality of LED into subsets can comply with this criterion. When such various arrangements are determined, one of these arrangements may then be selected which best complies with a further criterion, e.g. the capability of supplying a desired illumination characteristic across a range of set points. As an example of such a further criterion, the capability of generating a desired color set point across a desired dimming range can be mentioned.

As discussed above with respect to the first method of the invention, it may be desirable that a desired or required dimming range is generated by the same set of LEDs/virtual LEDs, such that no transition from one set to another is noticed when a user adjusts an intensity level in accordance with the dimming range.

In an embodiment, the selection of the set of virtual LEDs and any remaining LEDs is thus made such that the selected set is capable of generating the desired set point range, meaning that the entire set point range can be generated using the selected set.

Alternatively, in case no set can be established that can generate the desired illumination across the entire set point range, a set can be selected from the virtual LEDs and any remaining LEDs that can generate the largest portion of the desired set point range.

Yet alternatively, it may be important that certain portions of the required set point range, e.g. a low intensity portion or a high intensity portion, can be generated using the same set of LEDs and/or virtual LEDs. Such priorities or preferences can also be taken into account when selecting the most appropriate set from the virtual LEDs and any remaining LEDs.

As discussed above, there may be various reasons why a particular selected set of LEDs, e.g. a combination of virtual LEDs and any remaining LEDs, is not capable of generating a desired illumination characteristic.

At the high-intensity portion of a set point range, e.g. a dimming range, thermal or lifetime issues may arise when the required current to obtain the intensity for any of the LEDs exceeds the nominal or maximum current.

It can further be pointed out that at the lower end of a dimming range, where a comparatively low intensity of illumination is required, issues may arise as well. In order to accurately generate a low intensity illumination, the currents as supplied to the set of LEDs and/or the duty cycle as applied for said currents needs to be comparatively low. Typically, current levels and duty cycles may be difficult to adjust in a continuous manner. Rather, they can be adjusted in a discrete manner with a particular given resolution. As a result of this, desired or required intensities at the lower end of a desired dimming range may be difficult or impossible to achieve. In case a current or duty cycle can only be adjusted in a discrete manner, this may adversely affect the capabilities of attaining very low intensity levels, or maintaining a desired color set point for said intensity levels.

As such, different sets of LEDs as selected may have different capabilities of realising intensity levels at the lower end of a desired dimming range, and may e.g. be ranked with respect to this capability.

In an embodiment of the present invention, a set of LEDs, e.g. a combination of virtual LEDs and optionally one or more remaining LEDs can be selected based on its capabilities to realise a high-intensity portion of a desired dimming range, based on its capabilities to realise a low-intensity portion of a desired dimming range, or a combination thereof.

In an embodiment of the present invention, a set of LEDs is selected which can realise the largest portion of a desired dimming range.

In yet another embodiment, rather than selecting a single set of LEDs, e.g. a combination of virtual LEDs and optionally one or more remaining LEDs, suitable to realize a required dimming range, one can select a first set of LEDs suitable to realize a first portion of a required dimming range and a second set of LEDs suitable to realize a second portion of the required dimming range, whereby the first portion at the second portion at least partially overlap and, when combined, overlap the entire required dimming range.

In an embodiment, there may be various options to select such a first set, realizing a first portion of a required dimming range, and a second set, realizing a second portion of a required dimming range.

In such case, it may be advantageous to apply a further criterion to select the most suitable first set and second set. Such a criterion can e.g. be the CRI of the light generated by the subsets or the capability of the set to generate light with a comparatively low flicker-index.

It can also be pointed out that the sets as selected may have one or more LEDs in common.

In case such a first set, realizing a first portion of a required dimming range, and a second set, realizing a second portion of a required dimming range are selected, whereby the first and second portion overlap, it may be advantageous to arrange for a gradual, smooth transition between an operation using the first set and an operation using the second set during an adjustment of the dimming level by a user.

As an example, one can consider that the first set may advantageously be applied at lower intensities, the first portion thus corresponding to a low-intensity portion of the required dimming range, whereas the second set may advantageously be applied at higher intensities, the second portion thus corresponding to a high-intensity portion of the required dimming range. When the application of the first set is indicated as A and the application of the second set is indicated as B, an operation in the first portion can be indicated as AAAAAAAA.... Whereas an operation in the second portion of the dimming range can be indicated as BBBBBBBB....

When a user wants to change the intensity set point of the illumination as generated from a set point in the first portion of the dimming range to a set point in the second portion of the dimming range, a gradual transition from operating as AAAAAA . . . to BBBBBBB . . . may advantageously be established to avoid or mitigate that the user perceives any changes or hiccups in the color or intensity of the generated illumination.

A possible transition can e.g. be going from AAAAA to BABAA to BABAB to BBABB to BBBBB, whereby each A or B indicates the use of the first resp. second set of LEDs during a predetermined period, e.g. 1 millisecond.

In an embodiment, the second method according to the invention further comprises the determination of a set of intensity set points for the selected set. The set of intensity set points of the corresponding set of LEDs represents the mathematical description of the intensities of the LEDs to obtain or approximate the desired color and intensity in the color space.

In a further embodiment, each selected subset of the second method according to the invention is used to drive the plurality of LEDs with the corresponding set of intensity set points.

According to a second aspect of the invention, there is provided a first LED driver configured to control a LED fixture comprising a plurality of LEDs, the plurality of LEDs comprising at least four LEDs, configured to emit light of different colors, the LED driver comprising:
  a power converter for converting an input power at an input terminal to a current at an output terminal,
  a control unit arranged to control the power converter, as such the power converter provides the current to the LED fixture, and wherein the control unit is further arranged to:
    receive a set point representing a desired color and intensity for the light to be generated by the LED fixture;
    determine, based on available color characteristics of the plurality of LEDs, at least two different subsets of the plurality of LEDs and a set of intensity set points for each of the at least two different subsets, wherein each set of intensity set points, when applied by the LED driver, would result in obtaining or approximating the desired color and intensity by the LED fixture;
    select the subsets of the plurality of LEDs with the corresponding sets of intensity set points which meets best a predetermined criterion;
    use the selected subset to drive the plurality of LEDs with the corresponding set of intensity set points.

According to a second aspect of the invention, there is also provided a second LED driver configured to control a LED fixture comprising a plurality of LEDs, the plurality of LEDs comprising at least four LEDs, configured to emit light of different colors, the LED driver comprising:
  a power converter for converting an input power at an input terminal to a current at an output terminal,
  a control unit arranged to control the power converter, as such the power converter provides the current to the LED fixture, and wherein the control unit is further arranged to:
    receive a set point representing a desired color at a desired intensity for the light to be generated by the LED fixture;
    arrange, based on the received set point and/or available color characteristics of the plurality of LEDs and/or a predetermined criterion, at least a part of the plurality of LEDs in one or more different subsets, wherein each subset comprises at least two different LEDs;
    determine for each subset a virtual LED, based on the color characteristics of the LEDs of the subset, assuming a predetermined current-ratio of the LEDs of the subset, and replacing each subset by the determined virtual LED;
    selecting, from the determined virtual LEDs and any remaining LEDs a set which meet best the predetermined criterion or a further predetermined criterion.

The first and second LED driver according to the present invention can thus be configured to perform respectively the first and second method of controlling an LED fixture according to the present invention.

In general, a power converter of a LED driver according to the invention is powered at an input terminal by a power supply, e.g. a DC power supply derived from a mains supply by means of an AC/DC converter. Such an AC (alternating current)/DC (direct current) converter can be arranged to convert an alternating current source (or more general, a power source) to a substantially direct current source (or more general, a power source). AC/DC converters are widely applied to convert an AC power source such as a mains connection (e.g. 230 V, 50 Hz) to a DC power source. The output of said DC power source may then be applied to power a load or may be applied to power a further power source such as a power converter of an LED driver.

The plurality of LEDs of the LED fixture are powered by a power converter, which power converter can be a switched mode power supply (SMPS). Such a switched mode power source may e.g. comprise an inductance, an unidirectional element such as a diode and a switching element, e.g. a FET or a MOSFET. The switching of the switching element can e.g. be controlled by a controller or control unit. At present, different types of power sources (in particular current sources) are applied for such powering of the plurality of LEDs. As an example, a so-called buck-regulator can be applied. It is further acknowledged that other types of power converters such as boost, buck-boost, CUK, SEPIC or other, either synchronous or non-synchronous may advantageously be applied in combination with the present invention.

A control unit of the LED driver according to the invention receives a set point representing a desired color and intensity for the light to be generated by the light fixture. To control the power converter to provide a current to the LED fixture, which results in obtaining or approximating the desired color with the desired characteristics (e.g. intensity), the control unit of the LED driver may send a current control signal to the power converter. The current control signal could be an on/off signal, e.g. an analogue or digital signal to switch on/off the switching element of the power converter, thereby e.g. controlling the generated current.

In an embodiment, the control unit of the LED driver according to the invention is configured to send a LED control signal for operating at least one switch, wherein each switch is parallel to a different LED unit of the LED fixture, to obtain or approximate the desired color and intensity. The LED control signal could be an on/off signal, e.g. an analogue or digital signal to switch on/off a switch parallel to a LED unit. In addition, the control unit can send a current control signal to the power converter to control the power converter to provide a current to the plurality of LEDs of the LED fixture. The switching of a switch parallel to a LED unit is to set the LED unit in the on or off state. For example, the set of intensity set points of the corresponding subset may e.g. be composed of 50% of a blue LED to obtain or approximate the desired color. Note that the percentage is related to the intensity percentage at nominal current, as explained above. In this case, the switch parallel to the blue LED is half of the time open (i.e. the blue LED is on) and half of the time closed (i.e. the blue LED is off). In a preferred embodiment, the control unit of the LED driver comprises multiple switch control terminals, wherein each switch control terminal is connected to a different switch.

The control unit may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc.

In an embodiment, the control unit of the LED driver according to the invention is configured to send multiple current control signals to the power converter to control the power converter to provide a current value to each LED unit of the subset of the plurality of LEDs with the corresponding set of intensity points, which current value can be different for each LED unit, to obtain or approximate the desired color and intensity. For example, the set of intensity set points may e.g. be composed of 25% of a red LED and 50% of a blue LED to obtain or approximate the desired color and intensity. In this case, the power converter provides a first current value to the red LED, wherein the first current value is e.g. a quarter of the nominal current and a second current value to the blue LED, wherein the second current value is e.g. the half of the nominal current. In a preferred embodiment, the output terminal of the power converter comprises multiple output terminals, wherein each output terminal is connected to a different LED unit of the LED fixture.

In an embodiment, the control unit of the LED driver according to the invention comprises a first output control terminal and the power converter of the LED driver according to the invention comprises a first input control terminal, wherein the first output control terminal is connected to the first input control terminal. The current control signal may be sent by the control unit at the first output control terminal to the power converter at the first input control terminal.

In an embodiment, the LED control signal and/or the current control signal of the control unit of the LED driver according to the invention is based on the available color characteristics of the plurality of LEDs and the set point. The available color characteristics of the plurality of LEDs may be sent by the LED fixture or by a user interface to the control unit.

In an embodiment, the control unit of the LED driver according to the invention comprises a first control terminal, which first control terminal receives an LED characteristic signal, representing the available color characteristics of the plurality of LEDs. Preferably, the first control terminal of the control unit may be connected to a second control terminal or a user interface. Both non-limiting embodiments could provide information regarding the available color characteristics of the plurality of LEDs to the control unit. The user interface may e.g. be a remote control to prompt the available color characteristics. The second control terminal could be an output terminal of the LED fixture comprising the plurality of LEDs which may be connectable to the control unit.

In an embodiment, the control unit of the LED driver according to the invention comprises a second input control terminal, which second input control terminal receives the set point, representing the desired color and intensity for the light to be generated by the LED fixture.

In a similar manner as with the first aspect of the invention, various criteria can be applied to select or group the LEDs into subsets or sets. Subsequently, a most suitable selection of a set or subset can then be made, based on a predetermined criterion. In particular, the subset or set can be selected such that it can generate a desired illumination across a desired set point range, rather than merely a single set point. Such a desired set point range can e.g. be or include a dimming range of a particular color set point.

Referring to the explanation given above, the LED driver according to the present invention can thus be configured to select the most suitable combination of LEDs to meet a criterion or a combination of criteria. In addition, by grouping the LEDs according to the methods of the present invention, the number of control variables like current, duty cycle is reduced, thus enabling a faster calculation of the control variables that need to be applied in order to arrive at the desired illumination set point.

In an embodiment, the LED driver according to the invention, in particular the control unit of said LED driver can be configured to, when the set point or the plurality of set points comprises a required dimming range and wherein the step of selecting one or more sets or subsets comprises selecting a first set or subset of LEDs to realize a first portion of the required dimming range and a second set or subset of LEDs to realize a second portion of the required dimming range, whereby the first portion at the second portion at least partially overlap and, when combined, overlap the entire required dimming range.

BRIEF DESCRIPTION OF THE FIGURES

Further advantages, embodiments and features of the invention will become clear from the appended figures and corresponding description, showing non-limiting embodiments in which:

FIG. 1 schematically depicts an embodiment of a flow diagram of the first method according to the invention;

FIG. 2a schematically depicts an embodiment of a plurality of LEDs of an LED fixture and a set point mapped in a chromaticity diagram;

FIGS. 2b, 2c and 2d depict different subsets of the plurality of LEDs with the corresponding sets of intensity set points chosen such that the resulting color point matches the set point according to FIG. 2a;

FIG. 3a schematically depicts an alternative embodiment of a plurality of LEDs of an LED fixture and a set point mapped in a chromaticity diagram;

FIGS. 3b, 3c and 3d depict different subsets of the plurality of LEDs with the corresponding sets of intensity set points chosen such that the resulting color point matches the set point according to FIG. 3a;

FIGS. 10a-10j schematically depicts an alternative embodiment of a plurality of LEDs of an LED fixture and a set point mapped in a chromaticity diagram according to the second method of the invention.

DESCRIPTION

Figure 2D:
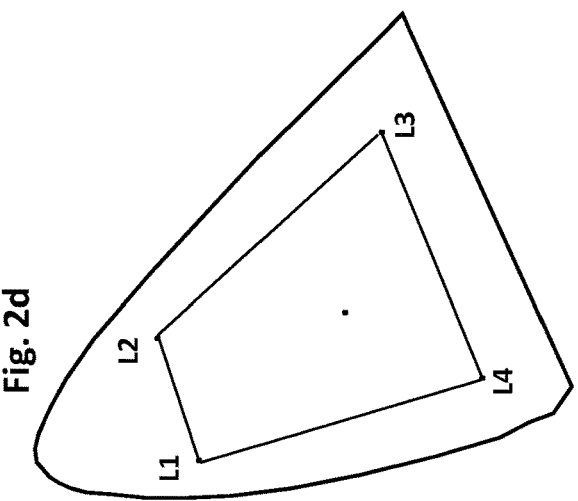

FIG. 1 schematically depicts a flow diagram of an embodiment of the method according to the invention for controlling an LED fixture comprising a plurality of LEDs configured to emit light of different colors in such a manner that a desired color is reached in an optimized way.

The method according to the invention comprises a first step 101 of receiving a set point representing a desired color at a desired intensity for the light to be generated by the LED fixture. The set point can e.g. be a mathematical description of the desired color in a color space. In particular, the set point represents the desired color in the color space. The color space is a specific organization of colors, for example the CIE 1931 color space, which can be visualised in a chromaticity diagram. The set point may e.g. be a co-ordinate in the CEI color space of the desired color with a corresponding intensity value. Also, alternatives to a mathematical description in a color space can be thought of, e.g. any signal that can be mapped, e.g. by a control unit, to a color space. In such case, the mathematical conversion is actually performed in the control unit. In an embodiment, the set point as received comprises a plurality of set points, e.g. a range of set points.

As will be appreciated, in case the LED fixture is intended to be used for different set points, e.g. different color set points and/or different intensity set points, these different set points can e.g. be described as a discrete set of different set points or as a range of set points. In the former case, the criterion applied to determine or select the most suitable subset can involve the selection of the subgroup which can realise the largest number of set points of the different set points. In case the different set points are described or defined as a range, the criterion may e.g. to select the subgroup which encompasses the desired or required range entirely or which encompasses the range in the best possible manner.

In case the different set points are different color set points, the different color set points can e.g. be represented in a CEI diagram. The selection of the most suitable subset of LEDs may result in the selection of the subset who's gamut contains all different color set points.

In an embodiment, the different set points are set points with the same color but with a different intensity. Such a set or range of different set points can be considered a dimming range, whereby the LED fixture is configured to generate illumination at a particular color set point at different intensity levels.

In case the required or desired intensity corresponds to an intensity range, also referred to as a dimming range, it may be desirable that the dimming range can be realised using the same subset of LEDs. By doing so, a smooth transition between different dimming levels can be obtained. In case one would have to switch from one subset to another subset, this may cause an undesirable visible transient. At the same time, it may be desirable to maintain the same color set point throughout the entire dimming range.

Further, the method comprises a second step 102, determining, based on available color characteristics of the plurality of LEDs, at least two different subsets of the plurality of LEDs and a set of intensity set points for each of the at least two different subsets, wherein each set of intensity set points results in obtaining or approximating the desired color by the LED fixture. A set of intensity set points associated with a particular subset of the LEDs may e.g. characterize the intensities of the subset of LEDs that, when applied, result in the obtaining or approximating of the desired color, as represented by the set point. The set of intensity set points of the corresponding subset represents the mathematical description of the obtained or approximated desired color by the corresponding subset of the plurality of LEDs of the LED fixture in the color space. The available color characteristics of the plurality of LEDs provide information about each LED unit of the LED fixture. The available color characteristics may in particular comprise information that enables to determine a co-ordinate in a color space for the LEDs. The available color characteristics may further comprise e.g. the LED color rendering index (CRI), LED spectrum, LED chromaticity, LED color stability etc.

In an embodiment, whereby a plurality of set points is received in step 101, the step 102 can be performed for the plurality of set points or a subset thereof. Phrased differently, the subsets and corresponding intensities can be determined for one or more of the plurality of set points. In case the plurality of set points comprises a plurality of different color set points, it may occur that certain subsets may only be capable of realizing some of the set points of the plurality of set points, whereas other subsets are capable or realizing all set points of the plurality of set points.

Thereafter, the method comprises a third step 103, selecting the subsets of the plurality of LEDs with the corresponding sets of intensity set points which meet a predetermined criterion. When multiple subsets fulfil the predetermined criterion, a second predetermined criterion is chosen so as to be left with only one single subset. Another possibility, is to select randomly a subset when a plurality of subsets fulfils the predetermined criterion. In the case that zero subsets fulfil the criterion, then the predetermined criterion would have to be relaxed or the method according to the invention would need to be used to select the subset that comes closest to the required set point. In an embodiment, the predetermined criterion of the method according to the invention may comprise e.g. a CRI value of the sets of intensity set points of the corresponding subsets of the plurality of LEDs, whereby said CRI value may e.g. be maximized by the selection, and/or efficiency value of the sets of intensity set points of the corresponding subsets of the plurality of LEDs, which efficiency value may be maximized by the selection and/or a lifetime value of the sets of intensity set points of the corresponding subsets of the plurality of LEDs, which lifetime value is maximized and/or a sensitivity value of the sets of intensity set points of the corresponding subsets of the plurality of LEDs, which sensitivity value is minimized. Furthermore, in an embodiment, the predetermined criterion of the method according to the invention comprises a desired intensity value, wherein the selecting step of the method comprises selecting the set of intensity set points of the corresponding subset of the plurality of LEDs with an overall intensity value, which overall intensity value meets best the predetermined criterion. In an alternative embodiment, the predetermined criterion is a weighted combination of the CRI value and/or efficiency value and/or lifetime value and/or intensity value and/or sensitivity value, which weighted combination is optimized.

In yet another embodiment of the present invention, the predetermined criterion comprises the capability of realizing the plurality of set points as received in step 101. This criterion may involve assessing whether or not the required intensities, required to realise the plurality of set points, can be realised in practice. In practice, the intensity that can be realised by an LED or a group or set of LEDs is limited by the current that can be supplied to the LED. The current that can be supplied to the LED can be limited or restricted by the LED itself or by the power source, e.g. an LED driver, powering the LED.

As such, in an embodiment of the present invention, the criterion applied to select the most appropriate subset involves assessing to what extend the different subsets are capable of realising the plurality of different set point. In an embodiment, the plurality of different set points can comprise a predetermined desired dimming range, optionally while maintaining substantially the same color set point.

Such an assessment can e.g. involve determining whether each LED or LED group in the subset can be provided with the required current across the entire dimming range or the entire group of set points. In particular, it can be assessed or checked whether or not a desired intensity, corresponding to an intensity in the dimming range, can be realised within the boundaries of the currents that can be supplied by the LED driver. It may for example occur that, a high intensity part of a desired dimming range cannot be realised using a particular subset, because this would require the supply current for one or more LEDs of the subset to be higher than a predetermined maximum current, said predetermined maximum current e.g. corresponding to the nominal current or a maximum current based on temperature constraints or lifetime constraints. Using such constraints, it may thus occur that certain subsets of the plurality of LEDs as selected, may only be capable of generating a part of portion of the desired dimming range, e.g. up to a particular intensity but not beyond.

It can further be pointed out that at the lower end of a dimming range, where a comparatively low intensity of illumination is required, issues may arise as well. In order to accurately generate a low intensity illumination, the currents as supplied to the LEDs and/or the duty cycle as applied for said currents needs to be comparatively low. Typically, current levels and duty cycles may be difficult to adjust in a continuous manner. Rather, they can be adjusted in a discrete manner with a particular given resolution. As a result of this, desired or required intensities at the lower end of a desired dimming range may be difficult or impossible to achieve. In case a current or duty cycle can only be adjusted in a discrete manner, this may adversely affect the capabilities of attaining very low intensity levels, or maintaining a desired color set point for said intensity levels.

As such, the different subsets of LEDs as selected may also be ranked with respect to their capabilities of realising intensity levels at the lower end of a desired dimming range.

In an embodiment of the present invention, a subset of LEDs can be selected based on its capabilities to realise a high-intensity portion of a desired dimming range, based on its capabilities to realise a low-intensity portion of a desired dimming range, or a combination thereof.

In an embodiment of the present invention, a subset of LEDs is selected which can realise the largest portion of a desired dimming range.

In yet another embodiment, rather than selecting a subset of LEDs suitable to realize a required dimming range, one can select a first subset of LEDs suitable to realize a first portion of a required dimming range and a second subset of LEDs suitable to realize a second portion of the required dimming range, whereby the first portion at the second portion at least partially overlap and, when combined, overlap the entire required dimming range.

In an embodiment, there may be various options to select such a first subset, realizing a first portion of a required dimming range, and a second subset, realizing a second portion of a required dimming range.

In such case, it may be advantageous to apply a further criterion to select the most suitable first subset and second subset. Such a criterion can e.g. be the CRI of the light generated by the subsets.

It can also be pointed out that the subsets as selected may have one or more LEDs in common.

In case such a first subset, realizing a first portion of a required dimming range, and a second subset, realizing a second portion of a required dimming range are selected, whereby the first and second portion overlap, it may be advantageous to arrange for a gradual, smooth transition between an operation using the first subset and an operation using the second subset during an adjustment of the dimming level by a user.

As an example, one can consider that the first subset may advantageously be applied at lower intensities, the first portion thus corresponding to a low-intensity portion of the required dimming range, whereas the second subset may advantageously be applied at higher intensities, the second portion thus corresponding to a high-intensity portion of the required dimming range. When the application of the first subset is indicated as A and the application of the second subset is indicated as B, an operation in the first portion can be indicated as AAAAAAAA . . . . Whereas an operation in the second portion of the dimming range can be indicated as BBBBBBBB . . . .

When a user wants to change the intensity set point of the illumination as generated from a set point in the first portion of the dimming range to a set point in the second portion of the dimming range, a gradual transition from operating as AAAAAA . . . to BBBBBBB . . . may advantageously be established to avoid or mitigate that the user perceives any changes or hiccups in the color or intensity of the generated illumination.

A possible transition can e.g. be going from AAAAA to BABAA to BABAB to BBABB to BBBBB, whereby each A or B indicates the use of the first resp. second subset of LEDs during a predetermined period, e.g. 1 millisecond.

FIG. 2a schematically depicts an embodiment of the method according to the invention, wherein a plurality of LEDs of a LED fixture and a set point are mapped or indicated in a chromaticity diagram 201. In this embodiment, the chromaticity diagram 201 is a CIE 1931 color space chromaticity diagram (x and y axes are not shown). However, also other color spaces are possible. The LED fixture comprises four different LEDs: a first green LED (L1) 202, a second green LED (L2) 203, a red LED (L3) 204 and a blue LED (L4) 205. In this case, the set point 206, i.e. representing a desired color, is mapped approximately in the centre of the chromaticity diagram. The predetermined criterion may be an efficiency value, wherein said efficiency value is for example set at 90%. Concerning the calculation of the efficiency value, the consumed power by the LED driver and the plurality of LEDs of a particular subset with the corresponding set intensity set points is compared to the consumed power when operating in a nominal state, which nominal state corresponds to operating at 100% efficiency. When receiving the set point 206, at least two different subsets of the plurality of LEDs and a set of intensity set points for each of the at least two different subsets, can be determined, based on available color characteristics of the plurality of LEDs.

Figure 2C:
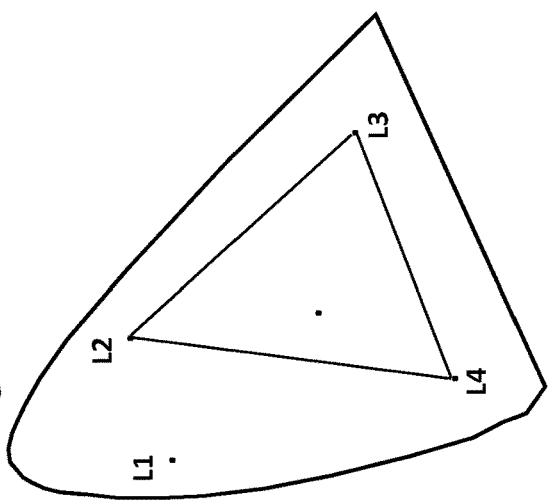
Figure 2B:
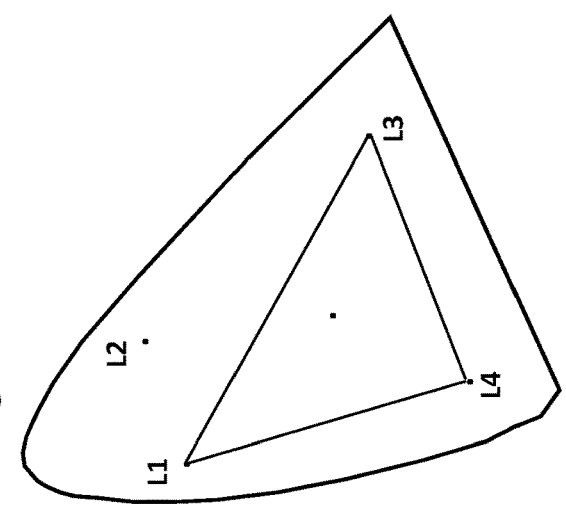

FIG. 2b shows a first subset comprising the first green LED, the red LED and the blue LED. The area or gamut covered by the formed triangle between the LEDs of the first subset represents all the possible colors that can be made with the first subset. For the first subset, the corresponding set of intensity points to obtain or approximate the desired color by the LED fixture may e.g. be composed of 30% of the first green LED, 40% of the blue LED and 30% of the red LED.

FIG. 2c shows a second subset comprising the second green LED, the red LED and the blue LED. The area covered by the formed triangle between the LEDs of the second subset represents all the possible colors that can be made with the second subset. For the second subset, the corresponding set of intensity points to obtain or approximate the desired color at the desired intensity by the LED fixture may e.g. be composed of 30% of the second green LED, 40% of the blue LED and 30% of the red LED. Note that it may be possible that not every color in the entire gamut can be made at the desired intensity because one or more of the LED currents may become the maximum current deliverable by the LED driver before having influenced the color enough to approximate or obtain the desired color. With the given percentages in this example, the user desired overall intensity is approximately 33% when defining the overall intensity at 100% as the intensity when all the three involved LEDs are operating at 100% intensity (i.e. at their nominal state). Suppose that the user want to have an overall intensity of 99%, then the required percentage of the blue LED would become 120%, i.e. well above the nominal current. This shows that the color point is no longer achievable at a desired overall intensity of 99%. Thus, there is an intensity limit on reachable colors in the different subsets.

FIG. 2d shows a third subset comprising the first green LED, the second green LED, the red LED and the blue LED. The area covered by the formed trapezium between the LEDs of the third subset represents all the possible colors that can be made with the third subset. For the third subset, the corresponding set of intensity points to obtain or approximate the desired color by the LED fixture may e.g. be composed of 25% of the first green LED, 25% of the second green LED, 25% of the blue LED and 25% of the red LED.

Note that for example a fourth subset comprising only the first green LED and the second green LED may not be sufficient enough to obtain or approximate the desired color by the LED fixture. The error or offset between the color obtained by a set of intensity set points of the fourth subset and the set point is too high.

Suppose that the set of intensity set points of the corresponding third subset of FIG. 2d does not meet the predetermined criterion, because the usage of four LEDs is less efficient compared to the usage of three LEDs. Therefore, the set of intensity set points of the corresponding first subset of FIG. 2b and the set of intensity set points of the corresponding second subset of FIG. 2c are selected which meet the predetermined criterion.

FIG. 3a schematically depicts an embodiment of the method according to the invention, wherein a plurality of LEDs of an LED fixture and a set point are mapped in a chromaticity diagram 301. In this embodiment, the chromaticity diagram 301 is a CIE 1931 color space chromaticity diagram (x and y axes are not shown). However, also other color spaces are possible. The LED fixture comprises four different LEDs: a first green LED (L1) 302, a second green LED (L2) 303, a red LED (L3) 304 and a blue LED (L4) 305. In this case, the set point 306 is almost mapped approximately in between the first green LED and the blue LED. The predetermined criterion may be an efficiency value, wherein said efficiency value is for example set at 90%. When receiving the set point 306, at least two different subsets of the plurality of LEDs and a set of intensity set points for each of the at least two different subsets, can be determined, based on available color characteristics of the plurality of LEDs.

FIG. 3b shows a first subset comprising the first green LED, the second green LED and the blue LED. The area covered by the formed triangle between the LEDs of the first subset represents all the possible colors that can be made with the first subset. For the first subset, the corresponding set of intensity points to obtain or approximate the desired color by the LED fixture may e.g. be composed of 47.5% of the first green LED, 5% of the second green LED and 47.5% of the blue LED.

FIG. 3c shows a second subset comprising the first green LED and the blue LED. The straight line between the two LEDs of the second subset represents all the possible colors that can be made with the second subset. For the second subset, the corresponding set of intensity points to obtain or approximate the desired color by the LED fixture may e.g. be composed of 50% of the first green LED and 50% of the blue LED. As can be noticed, the set point does not lie on the gamut of the 2 LEDs. Despite the (small) offset between the set of intensity points and the set point, the second subset may meet the predetermined criterion.

FIG. 3d shows a third subset comprising the first green LED, the second green LED, the red LED and the blue LED. The area covered by the formed trapezium between the LEDs of the third subset represents all the possible colors that can be made with the third subset. For the third subset, the corresponding set of intensity points to obtain or approximate the desired color by the LED fixture may e.g. be composed of 45% of the first green LED, 5% of the second green LED, 5% of the red LED and 45% of the blue LED.

Suppose that the set of intensity set points of the corresponding third subset of FIG. 3d does not meet the predetermined criterion, because the usage of four LEDs is less efficient compared to the usage of three LEDs or two LEDs. Therefore, the set of intensity set points of the corresponding first subset of FIG. 3b and the set of intensity set points of the corresponding second subset of FIG. 3c are selected which meet the predetermined criterion. When the method according to the invention, further comprises selecting the set of intensity set points of the corresponding subset of the plurality of LEDs with a minimal number of LEDs, the second subset of FIG. 3c may be selected since the second subset comprises only 2 LEDs.

Figure 4:
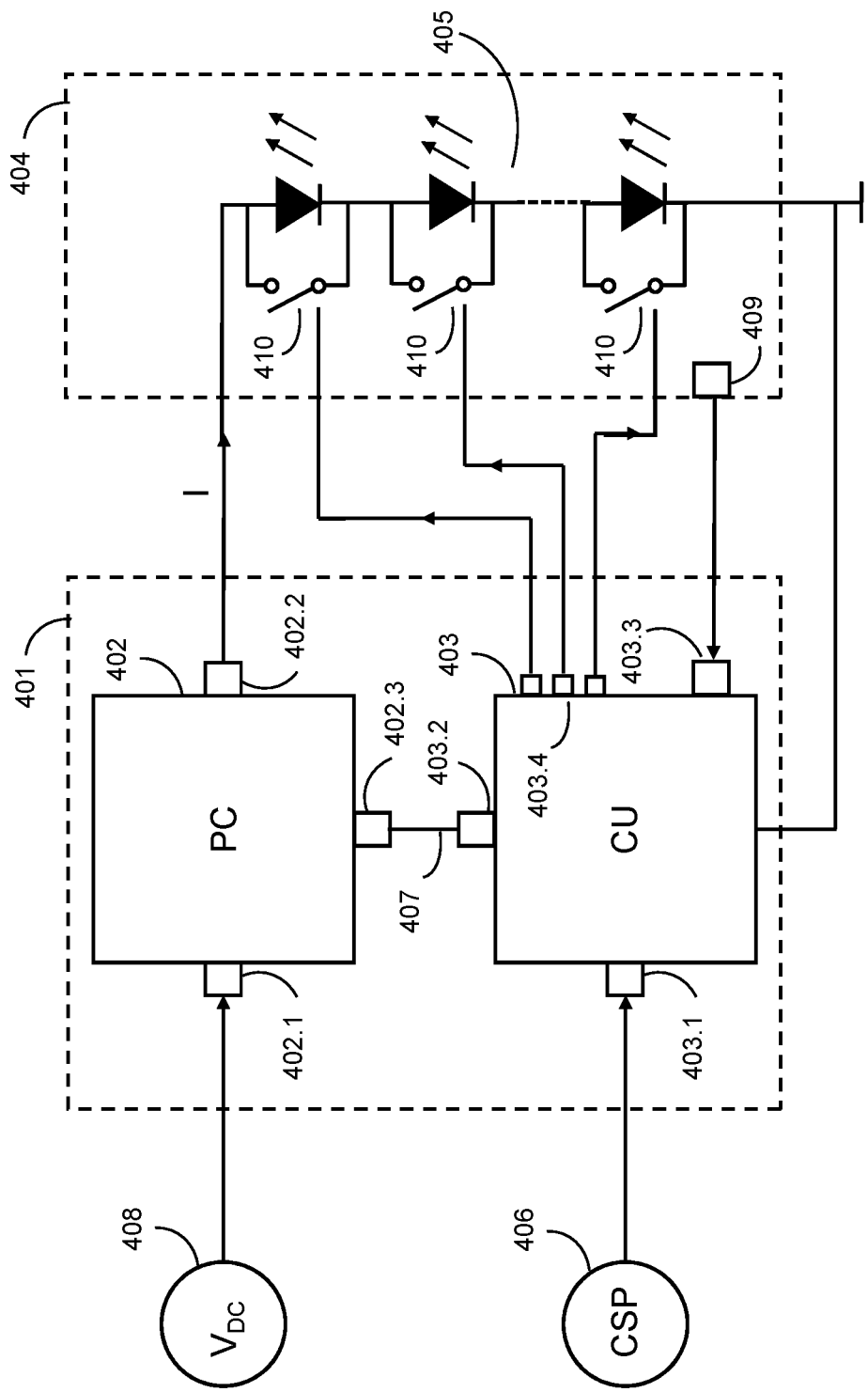
FIG. 4 schematically depicts a first embodiment of the LED driver according to the invention to drive the plurality of LEDs of the LED fixture.

FIG. 4 schematically depicts an embodiment of the LED driver according to the invention to drive a plurality of LEDs of a LED fixture. The LED driver 401 according to the invention comprises a power converter 402 for converting an input power at an input terminal 402.1 to a current I at an output terminal 402.2 and a control unit 403 arranged to control the power converter 402 such that the power converter 402 provides the current to the LED fixture 404 comprising the plurality of LEDs 405 configured to emit light of different colors. The control unit is further arranged to receive a set point 406 representing a desired color at a desired intensity for the light to be generated by the LED fixture 404. In an embodiment, the control unit 403 may comprise a second input control terminal 403.1, which second input control terminal 403.1 receives the set point 406. In an alternative embodiment, in addition to the set point, the second input control terminal 403.1 of the control unit 403 may receive an intensity set point, representing the intensity or dimming value of the desired color, which is at default the nominal intensity (i.e. when a nominal current is applied). The control unit 403 is further arranged to send a current control signal via a communication connection 407 at a first output control terminal 403.2 to a first input control terminal 402.3 of the power converter 402 to control the power converter 402. A current control signal is sent via the communication connection 407 by the control unit 403 to the power converter 402 to provide a current to the LED fixture 404. The magnitude of the current may be adjustable by the current control signal to dim or intensify the emitted light by the plurality of LEDs.

The power converter 402 of the LED driver 401 is powered at an input terminal 402.1 by a power supply 408. In FIG. 4, the power supply 408 is a DC supply voltage 408, supplying DC voltage $V_{DC}$. The required DC voltage can e.g. be derived from a mains supply, e.g. via an AC/DC converter. AC/DC converter are widely applied to convert an AC power source such as a mains connection (e.g. 230 V, 50 Hz) to a DC power source. The output of said DC power source may then be applied to power a load or may be applied to power a further power source such as a power converter of an LED driver.

In an embodiment, the control unit 403 may comprise a first control terminal 403.3, which first control terminal 403.3 can receive an LED characteristic signal, representing the available color characteristics of the plurality of LEDs. In an embodiment, the control unit is configured to execute the first method or second method according to the invention. Based on the available color characteristics of the plurality of LEDs, the control unit is arranged to determine at least two different subsets of the plurality of LEDs and a set of intensity set points for each of the at least two different subsets, wherein each set of intensity set points results in obtaining or approximating the desired color by the LED fixture 404. The control unit 403 is further arranged to select the subsets of the plurality of LEDs 405 with the corresponding sets of intensity set points which meet a predetermined criterion. In FIG. 4, the first control terminal 403.3 of the control unit 403 is connected to a second control terminal 409. The second control terminal 409 may be an output terminal of e.g. a second control unit of the LED fixture 404, comprising the plurality of LEDs 405. The second control terminal 409 of the LED fixture 404 could be arranged to receive or hold the available color characteristics of each LED (e.g. the CRI value) and send the information to the control unit 403 of the LED driver 401. The second control unit may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc. Also other examples are applicable to receive the available color characteristics of each LED and send the available color characteristics to the control unit 403 of the LED driver 401, such as RFID-tags or a set of resistors or a passive memory chip f.e. readable through UNI-I/O or a user interface.

In an embodiment, the control unit 403 of the LED driver 401 is configured to send a LED control signal for operating at least one switch, wherein each switch 410 is parallel to a different LED unit of the LED fixture 404, to obtain or approximate the desired color. The control unit 403 may comprise multiple switch control terminals 403.4, wherein each switch control terminal 403.4 is connected to a different switch 410. In FIG. 4, based on the available color characteristics and the set point 406, the control unit sends the LED control signal via multiple switch control terminals 403.4 to each switch 410 parallel to an LED unit of the LED fixture 404.

The LED control signal could be an on/off signal, e.g. an analogue or digital signal to switch on/off a switch 410 parallel to a LED unit. In addition, the control unit 403 sends the current control signal to the power converter 402 to control the power converter 402 to provide a current to the plurality of LEDs 405 of the LED fixture 404. The switching of a switch 410 parallel to a LED unit is to set the LED unit in the on or off state. For example, the set of intensity set points of the corresponding subset may e.g. comprise an intensity set point for the first LED-group of 50% to obtain or approximate the desired color. In this case, the switch parallel to the first LED is half of the time open (i.e. the first LED is on) and half of the time closed (i.e. the first LED is off).

In an embodiment, the LED driver according to the invention may be configured to execute the second method according to the invention. The LED driver is configured to control a LED fixture comprising a plurality of LEDs, the plurality of LEDs comprising at least four LEDs, configured to emit light of different colors, in accordance with the method according to the invention. In such embodiment, the LED driver comprises a power converter for converting an input power at an input terminal to a current at an output terminal and a control unit arranged to control the power converter to provide the current to the LED fixture. The control unit is further arranged to:

receive a set point representing a desired color at a desired intensity for the light to be generated by the LED fixture;
 arrange, based on the received set point and/or available color characteristics of the plurality of LEDs and/or a predetermined criterion, at least a part of the plurality of LEDs in one or more different subsets, wherein each subset comprises at least two different LEDs;
 determine for each subset a virtual LED, based on the color characteristics of the LEDs of the subset, assuming a predetermined current-ratio of the LEDs of the subset, and replacing each subset by the determined virtual LED; select, from the determined virtual LEDs and any remaining LEDs a set which meets best the predetermined criterion or a further predetermined criterion.

Figure 5:
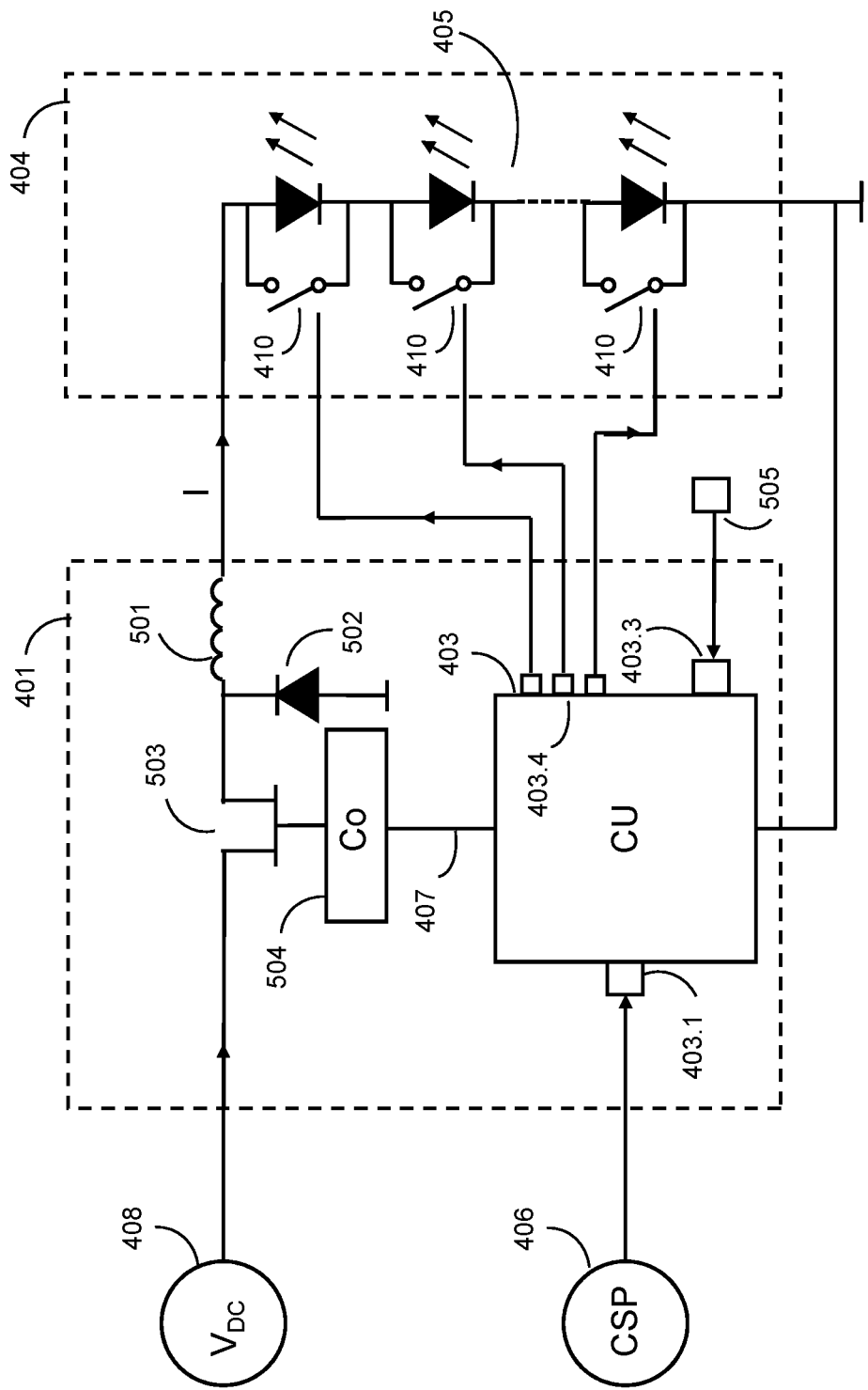
FIG. 5 schematically illustrates a switched mode power supply as the power converter of the LED driver according to the invention to drive the plurality of LEDs of the LED fixture.

FIG. 5 schematically illustrates a switched mode power supply as the power converter of the LED driver 401 according to the invention to drive the plurality of LEDs of the LED fixture. The LED driver 401 as shown in FIG. 5 comprises a power converter or a switched mode power supply and a control unit 403 to control the power converter 45 to drive the plurality of LEDs 405 of the LED fixture 405 by providing a current I. The power converter as shown in FIG. 5 is a so-called Buck converter, arranged to convert an input voltage VDC 405 to the signal line coming from 408 to a current I. In general, such a switched mode power converter comprises an inductance 501, a unidirectional element 502 such as a diode and a switching element 503, e.g. a FET or a MOSFET. Also, other types of converters such as boost, buck-boost, CUCK, SEPIC or other, either synchronous or non-synchronous may advantageously be applied in combination with the present invention. The switching of the switching element 503 can be controlled by a controller (Co) 504, based upon the current control signal from the control unit 403 of the LED driver 401 which current control signal is sent via a communication connection 407 to the controller 504. Note that the functionality of the control unit 403 and the controller 504 can be combined into one control unit.

In an embodiment, the control unit 403 comprises a first control terminal 403.3, which first control terminal 403.3 receives an LED characteristic signal, representing the available color characteristics of the plurality of LEDs 405. In FIG. 5, the first control terminal 403.3 of the control unit 403 is connected to a user interface 505. The user interface 505 may e.g. be a remote control to prompt the available color characteristics of the plurality of LEDs 405. The LED driver 401 in FIG. 5 further comprises the same features as the LED driver in FIG. 4. A combination of the FIGS. 4 and 5 embodiments may also be provided. As an example, the available color characteristics received by the first control terminal 403.1 of the control unit in FIG. 4, wherein the first control terminal is connected to a second control terminal 409, may be used in FIG. 5, wherein the first control terminal 403.1 of the control unit 403 is connected to the user interface 505, and vice versa.

The LED driver of FIG. 5 may also be configured to perform the first method or the second method according to the invention. In an embodiment, the control unit of the LED driver is configured to arrange, based on the received set point and/or available color characteristics of the plurality of LEDs and/or a predetermined criterion, at least a part of the plurality of LEDs in one or more different subsets, wherein each subset comprises at least two different LEDs. Further, the control unit is arranged to determine for each subset a virtual LED, based on the color characteristics of the LEDs of the subset, assuming a predetermined current-ratio of the LEDs of the subset, and replacing each subset by the determined virtual LED. Finally, the control unit is configured to select the subsets of the plurality of LEDs which meet best a predetermined criterion.

In an embodiment, the LED driver according to the invention, in particular the control unit of the LED driver can be configured to:

a) receive a set point representing a desired color at a desired intensity for the light to be generated by the LED fixture;
 b) arrange, based on the received set point and/or available color characteristics of the plurality of LEDs and/or a predetermined criterion, at least a part of the plurality of LEDs in one or more different subsets, wherein each subset comprises at least two different LEDs;
 c) determine for each subset a virtual LED, based on the color characteristics of the LEDs of the subset, assuming a predetermined current-ratio of the LEDs of the subset, and replacing each subset by the determined virtual LED;
 d) select, from the determined virtual LEDs and any remaining LEDs, one or more sets which meet best the predetermined criterion or a further predetermined criterion.

In such embodiment, the set point can comprise a required dimming range and the step of selecting one or more sets can comprise selecting a first set of LEDs to realize a first portion of the required dimming range and a second set of LEDs to realize a second portion of the required dimming range, whereby the first portion at the second portion at least partially overlap and, when combined, overlap the entire required dimming range.

Figure 6:
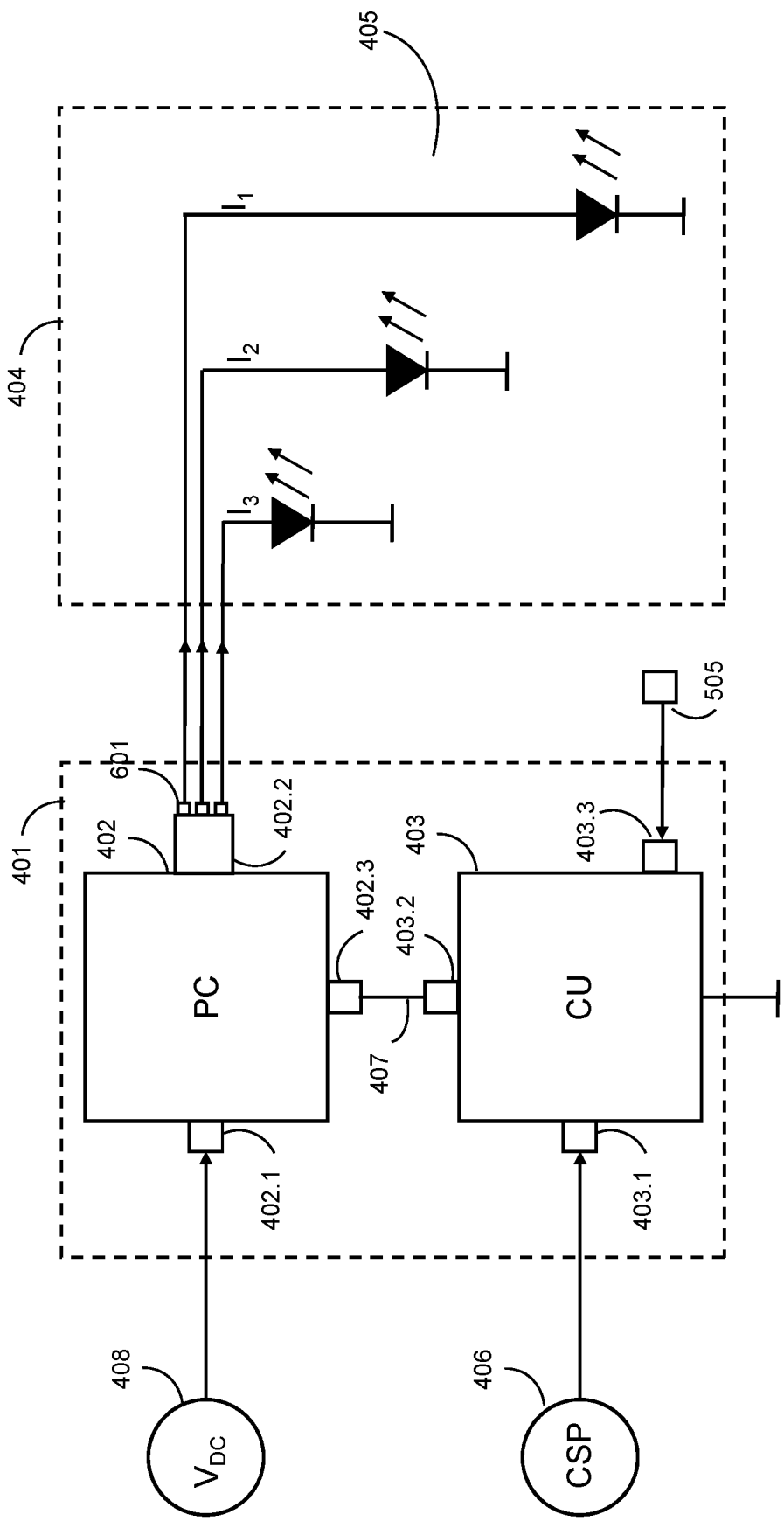
FIG. 6 schematically depicts a second embodiment similar to FIG. 4 of the LED driver according to the invention to drive the plurality of LEDs of the LED fixture.

FIG. 6 schematically depicts a second embodiment similar to FIG. 4 of the LED driver according to the invention to drive a plurality of LEDs of a LED fixture. The LED driver 401 according to the invention comprises a power converter 402 for converting an input power at an input terminal 402.1 to a current at an output terminal 402.2 and a control unit 403 arranged to control the power converter 402 such that the power converter 402 provides the current to the LED fixture 404 comprising the plurality of LEDs 405 configured to emit light of different colors.

The control unit of the LED driver of FIG. 6 is configured to perform the first method or the second method according to the invention. In an embodiment, the control unit 403 may comprise a first control terminal 403.3, which first control terminal 403.3 can receive an LED characteristic signal, representing the available color characteristics of the plurality of LEDs. Based on the available color characteristics of the plurality of LEDs 405, the control unit is arranged to determine at least two different subsets of the plurality of LEDs 405 and a set of intensity set points for each of the at least two different subsets, wherein each set of intensity set results in obtaining or approximating the desired color by the LED fixture 404. The control unit is further arranged to select the subsets of the plurality of LEDs 405 with the corresponding sets of intensity set points which meet a predetermined criterion.

In an embodiment, the LED driver according to the invention is configured to receive a set point representing a desired color at a desired intensity for the light to be generated by the LED fixture. The LED driver comprises a power converter for converting an input power at an input terminal to a current at an output terminal and a control unit arranged to control the power converter, as such the power converter provides the current to the LED fixture. The control unit is further configured to arrange, based on the received set point and/or available color characteristics of the plurality of LEDs and/or a predetermined criterion, at least a part of the plurality of LEDs in one or more different subsets, wherein each subset comprises at least two different LEDs. Further, the control unit is arranged to determine for each subset a virtual LED, based on the color characteristics of the LEDs of the subset, assuming a predetermined current-ratio of the LEDs of the subset, and replacing each subset by the determined virtual LED. Finally, the control unit is configured to select the subsets of the plurality of LEDs which meet best a predetermined criterion.

The control unit 403 is further configured to send multiple current control signals via a communication connection 407 at a first output control terminal 403.2 to a first input control terminal 402.3 of the power converter 402. The multiple current control signals are sent via the communication connection 407 by the control unit 403 to the power converter 402 to control the power converter to provide a current value to each LED unit of the subset of the plurality of LEDs 405 with the corresponding set of intensity set points, which current value can be different for each LED unit (e.g. I1, I2 and I3), to obtain or approximate the desired color. The multiple current control signals of the control unit may be based on the available color characteristics of the plurality of LEDs 405 and the set point 406. The magnitude of the current, or rather the intensity may be controllable by the multiple current control signals to dim or intensify the emitted light by the plurality of LEDs 405. In an embodiment, the output terminal of the power converter comprises multiple output terminals 601, wherein each output terminal 601 is connected to a different LED unit of the LED fixture 404.

Figure 7:
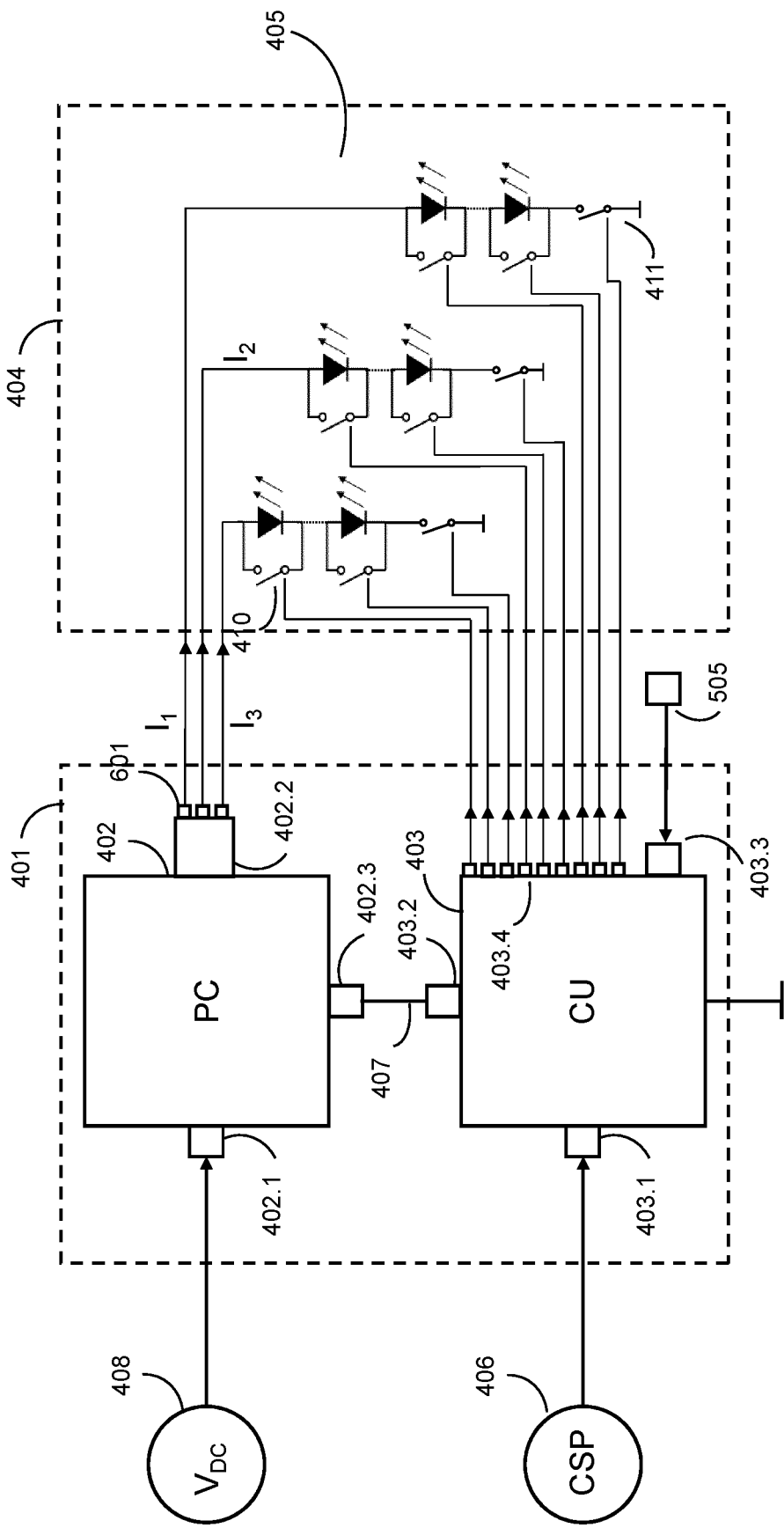
FIG. 7 schematically depicts a third embodiment as similar to FIGS. 4 and 6 of the LED driver according to the invention to drive the plurality of LEDs of the LED fixture, FIG. 8 schematically depicts an embodiment of a flow diagram of the second method according to the invention.

FIG. 7 schematically depicts a third embodiment similar to FIGS. 4 and 6 of the LED driver according to the invention to drive a plurality of LEDs of a LED fixture. The LED driver 401 comprises a power converter 402 and a control unit 403, wherein both the power converter 402 and the control unit 403 can directly drive the plurality of LEDs 405 of the LED fixture 404. The LED driver of FIG. 7 may also be configured to perform the first method or the second method according to the invention.

The control unit 403 is configured to send multiple current control signals via a communication connection 407 at a first output control terminal 403.2 to a first input control terminal 402.3 of the power converter 402 (i.e. similar as in FIG. 6). The multiple current control signals are sent via the communication connection 407 by the control unit 403 to the power converter 402 to control the power converter to provide a current value to each LED unit of the subset of the plurality of LEDs 405 with the corresponding set of intensity set points, which current value can be different for each LED unit (e.g. I1, I2 and I3), to obtain or approximate the desired color. The multiple current control signals of the control unit may be based on the available color characteristics of the plurality of LEDs 405 and the set point 406. The magnitude of the current, or rather the intensity may be controllable by the multiple current control signals to dim or intensify the emitted light by the plurality of LEDs 405. In an embodiment, the output terminal of the power converter comprises multiple output terminals 601, wherein each output terminal 601 is connected to a different LED unit of the LED fixture 404.

The control unit 403 of the LED driver 401 is further configured to send a LED control signal for operating at least one switch, wherein each switch 410 is parallel to a different LED unit of the LED fixture 404, to obtain or approximate the desired color (i.e. similar as in FIG. 4). The control unit 403 may comprise multiple switch control terminals 403.4, wherein each switch control terminal 403.4 is connected to a different switch 410. Based on the available color characteristics and the set point 406, the control unit 403 send the LED control signal via multiple switch control terminals 403.4 to each switch 410 parallel to a LED unit of the LED fixture 404. In this way, the current flowing through a LED unit can be controlled with higher precision by the combined multiple current control signals and LED control signal sent by the control unit 403.

At the end of each chain, a switch 411 is arranged in series with the LED of a particular chain of LEDs of the LED fixture 404. The control unit 403 is also connected to each switch 411, to control said switch. Hence, the control unit can be configured to control all LEDs in the particular chain at the same time by sending the LED control signal via multiple switch control terminal 403.4 to the switch 411 of the chain.

FIG. 8 schematically depicts a flow diagram of an embodiment of the second method according to the invention for controlling an LED fixture comprising a plurality of LEDs configured to emit light of different colors.

The method according to the invention comprises a first step 801 of receiving a set point representing a desired color at a desired intensity for the light to be generated by the LED fixture.

In an embodiment, the set point as received comprises a plurality of set points, e.g. a range of set points.

As will be appreciated, in case the LED fixture is intended to be used for different set points, e.g. different color set points and/or different intensity set points, these different set points can e.g. be described as a discrete set of different set points or as a range of set points. In the former case, the criterion applied to determine or select the most suitable subset can involve the selection of the subgroup which can realise the largest number of set points of the different set points. In case the different set points are described or defined as a range, the criterion may e.g. to select the subgroup which encompasses the desired or required range entirely or which encompasses the range in the best possible manner.

In case the different set points are different color set points, the different color set points can e.g. be represented in a CEI diagram. The selection of the most suitable subset of LEDs may result in the selection of the subset who's gamut contains all different color set points.

In an embodiment, the different set points are set points with the same color but with a different intensity. Such a set or range of different set points can be considered a dimming range, whereby the LED fixture is configured to generate illumination at a particular color set point at different intensity levels.

In case the required or desired intensity corresponds to an intensity range, also referred to as a dimming range, it may be desirable that the dimming range can be realised using the same subset of LEDs. By doing so, a smooth transition between different dimming levels can be obtained. In case one would have to switch from one subset to another subset, this may cause an undesirable visible transient. At the same time, it may be desirable to maintain the same color set point throughout the entire dimming range.

Further, the method comprises a second step 802, arranging, based on the received set point and/or available color characteristics of the plurality of LEDs and/or a predetermined criterion, at least a part of the plurality of LEDs in one or more different subsets, wherein each subset comprises at least two different LEDs. The arrangement of the plurality of LEDs in one or more different subsets reduces the needed calculation time and complexity to obtain or approximate the desired color. The predetermined criterion may e.g. be the error margin between the plurality of LEDs and the desired color.

Thereafter, the method comprises a third step 803, defining for each subset a virtual LED based on the color characteristics of the LEDs of the subset, assuming a predetermined current-ratio of the LEDs of the subset, and replacing each subset by the virtual LED. With the predetermined current-ratio the current through the LEDs of a subset is determined in advance. The predetermined current-ratio is between 0 and 100% and may be different for different subsets. For example, when a subset comprises two different LEDs and the current-ratio is 100%, the virtual LED lies exactly in the middle of the virtual line on a color diagram between the two LEDs, i.e. each LED of the subset is provided with the same current or a current having the same amplitude or duty cycle.

The fourth step 804 of the second method according to the invention comprises selecting, from the determined virtual LEDs and any remaining LEDs one or more sets which meet best the predetermined criterion or a further predetermined criterion.

In an embodiment, the predetermined criterion or the further predetermined criterion of the second method according to the invention may comprise e.g. a CRI value of the sets of intensity set points of the corresponding subsets of the plurality of LEDs, whereby said CRI value may e.g. be maximized by the selection, and/or efficiency value of the sets of intensity set points of the corresponding subsets of the plurality of LEDs, which efficiency value may be maximized by the selection and/or a lifetime value of the sets of intensity set points of the corresponding subsets of the plurality of LEDs, which lifetime value is maximized and/or a sensitivity value of the sets of intensity set points of the corresponding subsets of the plurality of LEDs, which sensitivity value is minimized.

In yet another embodiment of the present invention, the predetermined criterion comprises the capability of realizing a plurality of set points as received in step 801. This criterion may involve assessing whether or not the required intensities, required to realise the plurality of set points, can be realised in practice. In practice, the intensity that can be realised by an LED or a group or set of LEDs is limited by the current that can be supplied to the LED. The current that can be supplied to the LED can be limited or restricted by the LED itself or by the power source, e.g. an LED driver, powering the LED.

In such embodiment, step 804 may further comprise determining a set of intensity set points for one or more of the sets. In such embodiment, the predetermined criterion as applied may thus comprise a capability of realising a plurality of set points or a subset thereof.

As such, in an embodiment of the present invention, the criterion applied to select the most appropriate subset involves assessing to what extend the different subsets are capable of realising the plurality of different set point. In an embodiment, the plurality of different set points can comprise a predetermined desired dimming range, optionally while maintaining substantially the same color set point.

Such an assessment can e.g. involve determining whether each LED or LED group in the subset can be provided with the required current across the entire dimming range or the entire group of set points. In particular, it can be assessed or checked whether or not a desired intensity, corresponding to an intensity in the dimming range, can be realised within the boundaries of the currents that can be supplied by the LED driver. It may for example occur that, a high intensity part of a desired dimming range cannot be realised using a particular subset, because this would require the supply current for one or more LEDs of the subset to be higher than a predetermined maximum current, said predetermined maximum current e.g. corresponding to the nominal current or a maximum current based on temperature constraints or lifetime constraints. Using such constraints, it may thus occur that certain subsets of the plurality of LEDs as selected, may only be capable of generating a part of portion of the desired dimming range, e.g. up to a particular intensity but not beyond.

It can further be pointed out that at the lower end of a dimming range, where a comparatively low intensity of illumination is required, issues may arise as well. In order to accurately generate a low intensity illumination, the currents as supplied to the LEDs and/or the duty cycle as applied for said currents needs to be comparatively low. Typically, current levels and duty cycles may be difficult to adjust in a continuous manner. Rather, they can only be adjusted in a discrete manner with a particular given resolution. As a result of this, desired or required intensities at the lower end of a desired dimming range may be difficult or impossible to achieve. In case a current or duty cycle can only be adjusted in a discrete manner, this may adversely affect the capabilities of attaining very low intensity levels, or maintaining a desired color set point for said intensity levels.

As such, the different subsets of LEDs as selected may also be ranked with respect to their capabilities of realising intensity levels at the lower end of a desired dimming range.

In an embodiment of the present invention, a subset of LEDs can be selected based on its capabilities to realise a high-intensity portion of a desired dimming range, based on its capabilities to realise a low-intensity portion of a desired dimming range, or a combination thereof.

In an embodiment of the present invention, a subset of LEDs is selected which can realise the largest portion of a desired dimming range.

In an embodiment, the second and third step of the second method according to the invention are repeated, using the virtual LEDs and remaining LEDs as the plurality LEDs, until the sum of virtual LEDs and remaining LEDs is three. Once there are only three LEDs remaining, the required currents to arrive at a desired set point can be easily determined. The calculation is straightforward, because there is only one solution possible.

In an embodiment, the second method according to the invention further comprises the determination of a set of intensity set points for the selected subsets. The set of intensity set points of the corresponding subset of the plurality of LEDs represents the mathematical description of the intensities of the LEDs to obtain or approximate the desired color and intensity in the color space.

In a further embodiment, each selected subset of the second method according to the invention is used to drive the plurality of LEDs with the corresponding set of intensity set points.

Figure 9C:
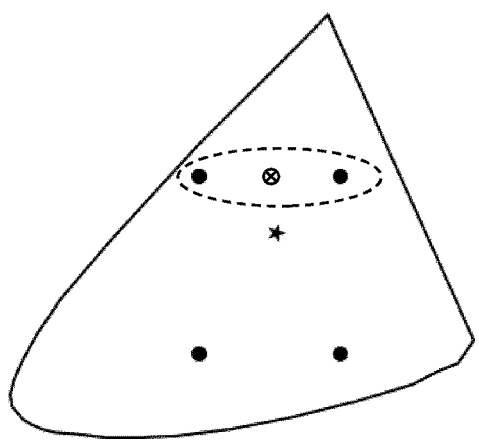
FIGS. 9a-9i schematically depicts an embodiment of a plurality of LEDs of an LED fixture and a set point mapped in a chromaticity diagram according to the second method of the invention.
Figure 9E:
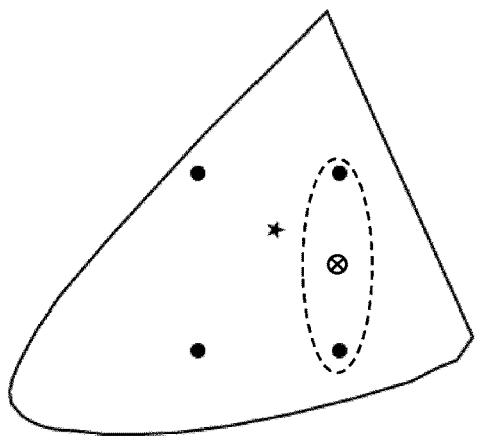
Figure 9B:
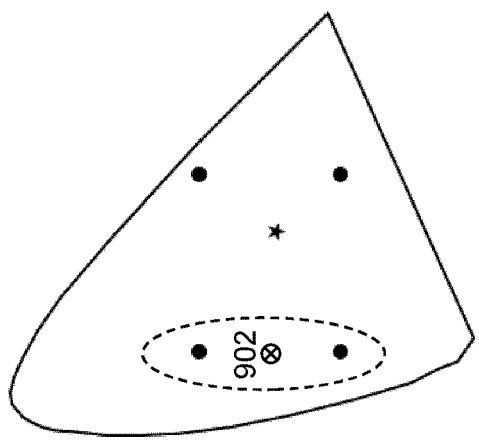
Figure 9D:
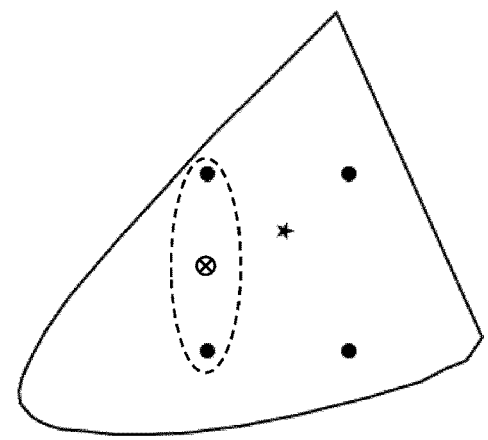
Figure 9A:
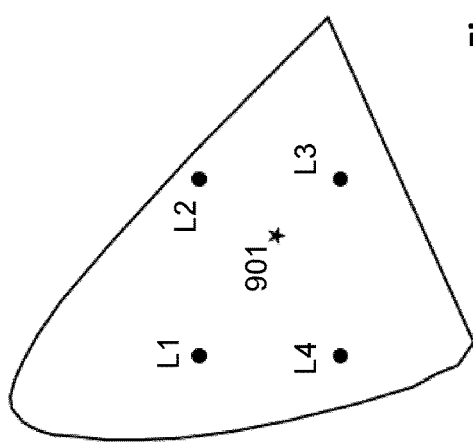
Figure 9F:
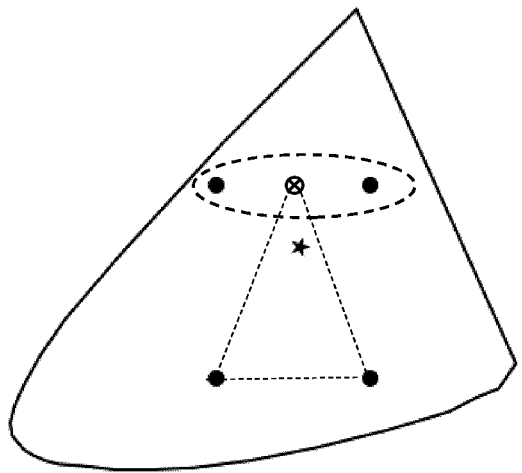
Figure 9G:
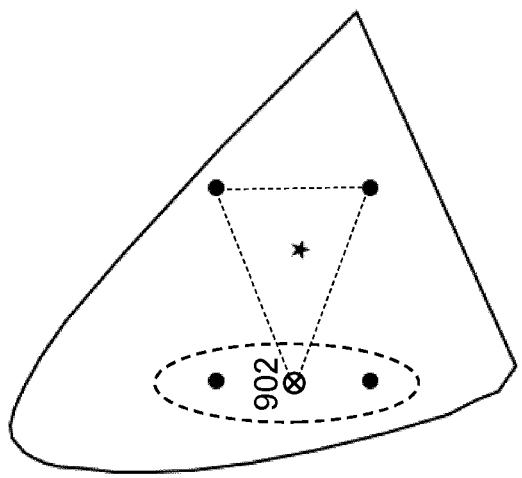
Figure 9I:
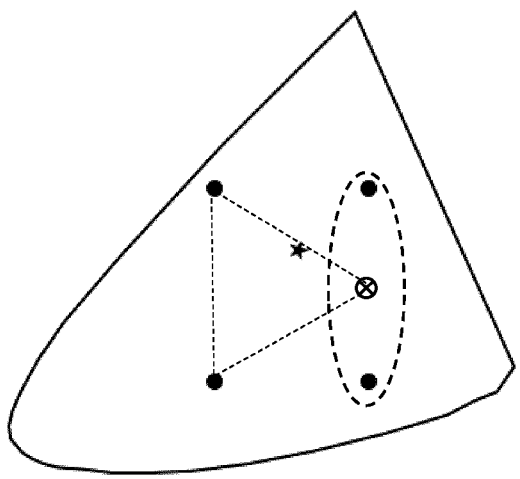
Figure 9H:
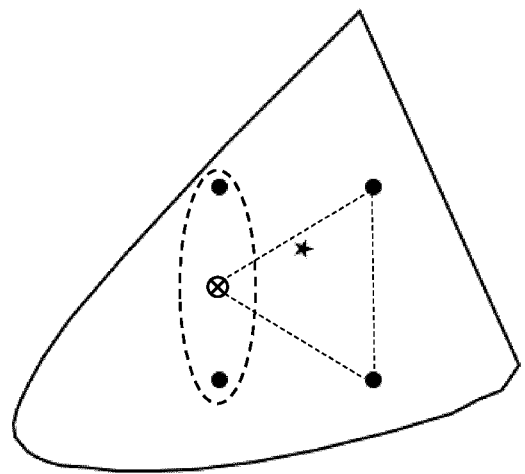

FIG. 9a schematically illustrates an embodiment of the second method according to the invention, wherein a plurality of LEDs of a LED fixture and a set point are mapped in a chromaticity diagram. The LED fixture comprises four different LEDs (L1, L2, L3 and L4), indicated by the filled circles. The set point 901 is visualised by the star-shaped symbol. FIGS. 9b-e show different examples of possible configurations to arrange the plurality of LEDs, based on the received set point and/or available color characteristics of the plurality of LEDs and/or a predetermined criterion, in one or more different subsets, wherein each subset comprises at least two different LEDs. The predetermined criterion may e.g. be the CRI of the LEDs.

FIGS. 9b-e depict four possible subsets: an arrangement or combination of L1 and L4 (FIG. 9b), L2 and L3 (FIG. 9c), L1 and L2 (FIG. 9d) and L3 and L4 (FIG. 9e) respectively. Note that these arrangements are for illustrative purposes and also other subsets are possible. For each subset in FIGS. 9b-e a virtual LED 902 can be defined, based on the color characteristics of the LEDs of the subset, assuming a predetermined current-ratio of the LEDs of the subset. For the subsets in FIGS. 9b-e the current-ratio of the LEDs of the subset is set at 100%. The current-ratio can e.g. be considered the current of L1 over the current of L4 for the arrangement of FIG. 9b. Thus, the virtual LEDs, indicated by the white dots with marks, are located at the centre between two LEDs of a subset. Note that, for a particular grouping of LEDs, LEDs that are not part of a subset may be referred to as remaining LEDs. In FIG. 9b, LEDs L2 and L3 may be referred to as remaining LEDs as they are not used in a subset. In FIG. 9b, virtual LED 902 takes the place of LEDs L1 and L2; when LEDs L1 and L2 are supplied with same current, they act as an LED having the CEI co-ordinates as virtual LED 902.

After the virtual LEDs are determined, the subsets of the plurality of LEDs which meet a predetermined criterion are selected. The predetermined criterion may e.g. be the efficiency. In FIGS. 9f-9i, the set point falls inside the boarders of the formed triangular area (see dotted lines) or gamut defined by two remaining LEDs of the plurality of LEDs and a virtual LED of the subset.

Note that, as mentioned above, the predetermined criterion as applied may involve assessing the capability of realizing a plurality of different set points, rather than the capability of realizing a single set point such as set point 901. In such embodiment, an assessment is made whether or not a selected set of virtual LEDs and remaining LEDs is capable of realizing each set point of the plurality of set points, or just a subset of the plurality of set points.

As mentioned above the plurality of different set points can be a discrete number of set points or can be a range of set points. The different set points can be characterised by a different color and/or a different intensity. In the latter case, the different set points may be part of a required dimming range.

In an embodiment, a set of virtual LEDs and LEDs is selected which best realizes the plurality of set points.

As mentioned above, there may be different reasons why a certain set point cannot be realised by a selected set. Such reasons e.g. being the required current for one or more of the LEDs being too high, or the resolution at which a current can be adjusted is too low to realize the required current.

Figure 10G:
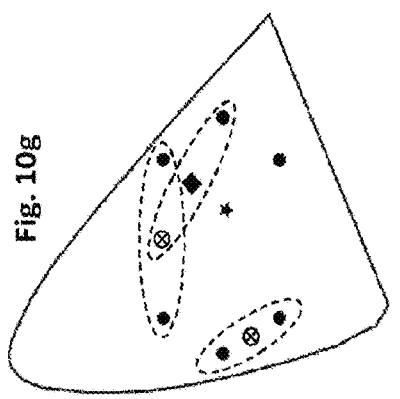
Figure 10F:
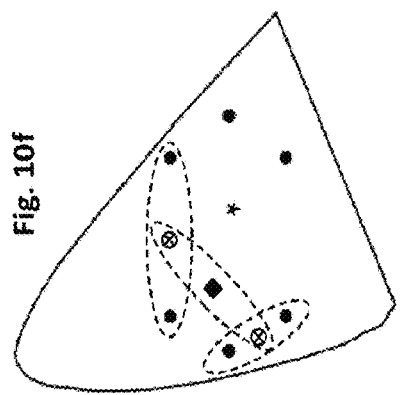
Figure 10E:
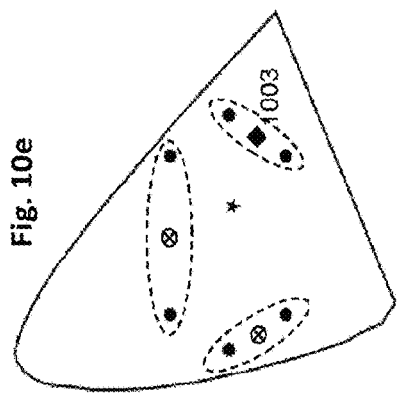
Figure 10D:
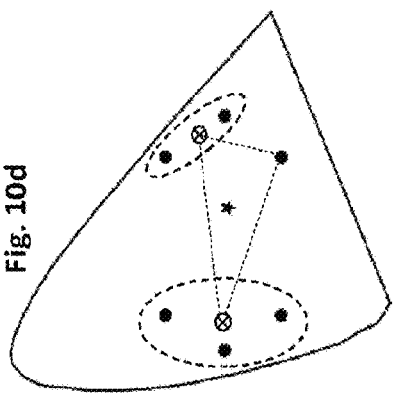
Figure 10C:
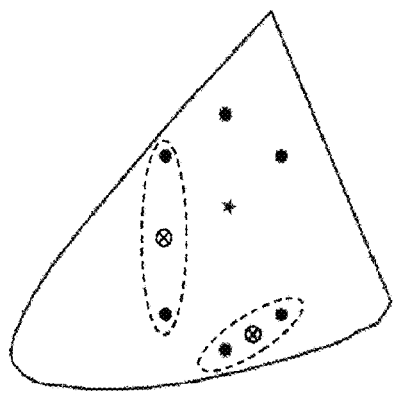
Figure 10B:
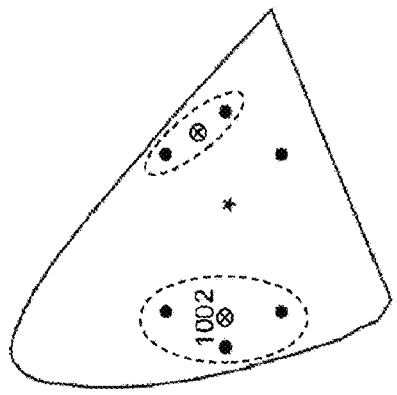
Figure 10A:
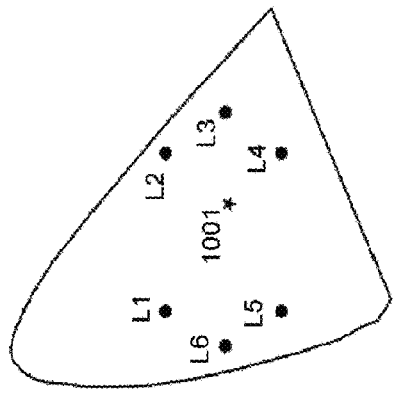

FIG. 10a schematically illustrates another embodiment of the second method according to the invention, wherein a plurality of LEDs of a LED fixture and a set point are mapped in a chromaticity diagram. The LED fixture comprises six different LEDs (L1, L2, L3, L4, L5 and L6), indicated by the filled circles. The set point 1001 is visualised by the star-shaped symbol.

FIGS. 10b-c show two different examples of possible configurations to arrange the plurality of LEDs, based on the received set point and/or available color characteristics of the plurality of LEDs and/or a predetermined criterion, in one or more different subsets, wherein each subset comprises at least two different LEDs. The predetermined criterion may e.g. be the CRI of the LEDs.

FIGS. 10b-c depict two possible arrangements: a first arrangement of subset L1, L5 and L6 with subset L2 and L3 (FIG. 10b) and a second arrangement of subset L5 and L6 with subset L1 and L2 (FIG. 10c). Note that these arrangements are for illustrative purposes and also other subsets are possible. For each subset in FIGS. 10b-c a virtual LED 1002 can be defined, based on the color characteristics of the LEDs of the subset, assuming a predetermined current-ratio of the LEDs of the subset. For the subsets in FIGS. 10b-c the current-ratio of the LEDs of the subset is set at 100%, i.e. all LEDs of a subset are assumed to be supplied by the same current or currents with the same amplitude or duty cycle. Thus, the virtual LEDs, indicated by the white dots with marks, are located at the centre between two LEDs of a subset.

After the virtual LEDs are determined, the subsets of the plurality of LEDs which meet a predetermined criterion are selected. The predetermined criterion may e.g. be the CRI. In FIG. 10b(I), the set point inside the boarders of the formed triangular area (see dotted lines) or gamut defined by two remaining LEDs of the plurality of LEDs and a virtual LED of the subset.

For FIG. 10c, the sum of virtual LEDs and remaining LEDs of the plurality of LEDs is four, and thus steps b-d of the second method according to the invention are repeated. FIGS. 10e-10g show three possible arrangements: a first arrangement of subset comprising L3 and L4 (FIG. 10e), a second arrangement of subset comprising the first virtual LED and the second virtual LED (FIG. 10f) and a third arrangement of subset comprising the first virtual LED and L3 (FIG. 10g). Note, that the three arrangements are different types of combinations: a combination with two virtual LEDs, a combination of a virtual LED with a remaining LED and a combination of two remaining LEDs.

In FIGS. 10e-10g a virtual LED 1003 can be defined, based on the color characteristics of the LEDs of the subset, assuming a predetermined current-ratio of the LEDs of the subset. For the subsets in FIGS. 10e-10g the current-ratio of the LEDs of the subset is set at 50%. Thus, the virtual LEDs, indicated by the filled rhombus symbol, are located at the centre.

After the virtual LEDs are determined, the subsets of the plurality of LEDs which meet a predetermined criterion are selected. The predetermined criterion may e.g. be the efficiency. In FIGS. 10h-10j, the set point falls inside the boarders of the formed triangular area (see dotted lines) or gamut defined by the virtual LEDs and/or remaining LEDs.

Note that, as mentioned above, the predetermined criterion as applied may involve assessing the capability of realizing a plurality of different set points, rather than the capability of realizing a single set point such as set point 901. In such embodiment, an assessment is made whether or not a selected set of virtual LEDs and remaining LEDs is capable of realizing each set point of the plurality of set points, or just a subset of the plurality of set points.

As mentioned above the plurality of different set points can be a discrete number of set points or can be a range of set points. The different set points can be characterised by a different color and/or a different intensity. In the latter case, the different set points may be part of a required dimming range.

In an embodiment, a set of virtual LEDs and LEDs is selected which best realizes the plurality of set points.

As mentioned above, there may be different reasons why a certain set point cannot be realised by a selected set. Such reasons e.g. being the required current for one or more of the LEDs being too high, or the resolution at which a current can be adjusted is too low to realize the required current.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A method of controlling an LED fixture comprising a plurality of LEDs, the plurality of LEDs comprising at least four LEDs, configured to emit light of different colors, the method comprising:
   receiving a plurality of set points, each representing a desired color at a desired intensity for the light to be generated by the LED fixture;
   determining, based on available color characteristics of the plurality of LEDs, at least two different subsets of the plurality of LEDs and a set of intensity set points for each of the at least two different subsets, wherein each set of intensity set points results in obtaining the desired color at the desired intensity of more than one of the plurality of set points by the LED fixture;
   selecting one or more of the subsets of the plurality of LEDs with the corresponding set of intensity set points which meets a predetermined criterion;
   using the one or more selected subsets to drive the plurality of LEDs with the corresponding set of intensity set points, whereby the predetermined criterion comprises a capability of realising the plurality of set points or a subset thereof.

2. A method of controlling an LED fixture comprising a plurality of LEDs, the plurality of LEDs comprising at least four LEDs configured to emit light of different colors, the method comprising:
   a) receiving a plurality of set points, each representing a desired color at a desired intensity for the light to be generated by the LED fixture;
   b) arranging, based on the received plurality of set points and available color characteristics of the plurality of LEDs or a predetermined criterion, at least a part of the plurality of LEDs in one or more different subsets, wherein each subset comprises at least two different LEDs;
   c) determining for each subset a virtual LED, based on the color characteristics of the LEDs of the subset, assuming a predetermined current-ratio of the LEDs of the subset, and replacing each subset by the determined virtual LED;
   d) selecting, from the determined virtual LEDs and any remaining LEDs, one or more sets which meet best the predetermined criterion or a further predetermined criterion,
   e) determining a set of intensity set points for one or more of the selected sets,
   whereby the predetermined criterion comprises a capability of realising the plurality of set points or a subset thereof.

3. The method according to claim 2, wherein steps b-d are repeated, using the virtual LEDs and remaining LEDs as the plurality LEDs, until the sum of virtual LEDs and remaining LEDs is three.

4. The method according to claim 2, wherein a set of intensity set points are determined for the selected subsets.

5. The method according to claim 4, wherein each selected subset is used to drive the plurality of LEDs with the corresponding set of intensity set points.

6. The method according to any of the claim 2, wherein the plurality of set points comprises a required dimming range and wherein the step of selecting one or more sets comprises selecting a first set of LEDs to realize a first portion of the required dimming range and a second set of LEDs to realize a second portion of the required dimming range, whereby the first portion at the second portion at least partially overlap and, when combined, overlap the entire required dimming range.

7. The method according to claim 6, further comprising:
   using the first set of LEDs to drive the plurality of LEDs when a desired set point is within the first portion of the required dimming range;
   using the second set of LEDs to drive the plurality of LEDs when the desired set point is within the second portion of the required dimming range, and
   applying a gradual transition from using the first set to using the second set during a transition from operating in the first portion of the required dimming range to operating in the second portion of the required dimming range.

8. The method according to claim 1, wherein the plurality of set points comprises a required dimming range and wherein the step of selecting one or more of the subsets comprises selecting a first subset of LEDs to realize a first portion of the required dimming range and a second subset of LEDs to realize a second portion of the required dimming range, whereby the first portion at the second portion at least partially overlap and, when combined, overlap the entire required dimming range.

9. The method according to claim 8, further comprising:
using the first subset of LEDs to drive the plurality of LEDs when a desired set point is within the first portion of the required dimming range;
using the second subset of LEDs to drive the plurality of LEDs when the desired set point is within the second portion of the required dimming range, and
applying a gradual transition from using the first subset to using the second subset during a transition from operating in the first portion of the required dimming range to operating in the second portion of the required dimming range.

10. The method according to claim 1, wherein the step of using the one or more selected subsets consists of using one selected subset to drive the plurality of LEDs with the corresponding set of intensity set points, the one selected subset being capable of realising the plurality of set points.

11. The method according to claim 1, further comprising selecting the one or more of the subsets of the plurality of LEDs with the corresponding set of intensity set points which meets best the predetermined criterion.

12. The method according to claim 2, wherein the further predetermined criterion comprises a CRI value associated with the sets of intensity set points of the corresponding subsets or sets of the plurality of LEDs.

13. The method according to claim 2, wherein the further predetermined criterion comprises an efficiency value of the sets of intensity set points of the corresponding subsets or sets of the plurality of LEDs.

14. The method according to claim 2, wherein the further predetermined criterion comprises a lifetime value of the sets of intensity set points of the corresponding subsets of the plurality of LEDs.

15. The method according to claim 2, wherein the further predetermined criterion comprises a desired intensity value of the corresponding subsets or sets of the plurality of LEDs, wherein the selecting step of the method comprises selecting the set of intensity set points of the corresponding subset of the plurality of LEDs with an intensity value, which intensity value meets best the predetermined criterion or the further predetermined criterion.

16. The method according to claim 2, wherein the further predetermined criterion comprises a sensitivity value of the sets of intensity set points of the corresponding subsets or sets of the plurality of LEDs.

17. The method according to claim 13, wherein the further predetermined criterion is a weighted combination of at least two of a CR value, the efficiency value, a lifetime value, an intensity value or a sensitivity value, which weighted combination is optimized.

18. The method according to claim 1, wherein a chromaticity distance, $\Delta E76$, between a first chromaticity co-ordinate in a color space of the obtained desired color by the set of intensity set points of the corresponding subset of the plurality of LEDs and a second chromaticity co-ordinate in the color space of the desired color is smaller than 2.

19. The method according to claim 1, further comprising selecting the set of intensity set points of the corresponding subset of the plurality of LEDs with a minimal number of LEDs, when at least two different sets of intensity set points of the corresponding subsets of the plurality of LEDs meets the predetermined criterion.

20. An LED driver configured to control a LED fixture comprising a plurality of LEDs, the plurality of LEDs comprising at least four LEDs, configured to emit light of different colors, the LED driver comprising:
a power converter for converting an input power at an input terminal to a current at an output terminal,
a control unit arranged to control the power converter, as such the power converter provides the current to the LED fixture, and wherein the control unit is further arranged to:
receive a plurality of set points, each representing a desired color at a desired intensity for the light to be generated by the LEDs fixture;
determine, based on available color characteristics of the plurality of LEDs, at least two different subsets of the plurality of LEDs and a set of intensity set points for each of the at least two different subsets, wherein each set of intensity set points results in obtaining the desired color at the desired intensity of more than one of the plurality of set points by the LED fixture;
select one or more of the subsets of the plurality of LEDs with the corresponding set of intensity set points which meets a predetermined criterion;
use the one or more selected subsets to drive the plurality of LEDs with the corresponding set of intensity set points, whereby the predetermined criterion comprises a capability of realising the plurality of set points or a subset thereof.

21. An LED driver configured to control a LED fixture comprising a plurality of LEDs, the plurality of LEDs comprising at least four LEDs, configured to emit light of different colors, the LED driver comprising:
a power converter for converting an input power at an input terminal to a current at an output terminal,
a control unit arranged to control the power converter, as such the power converter provides the current to the LED fixture, and wherein the control unit is further arranged to:
receive a plurality of set points representing a desired color at a desired intensity for the light to be generated by the LED fixture;
arrange, based on the received plurality of set points and available color characteristics of the plurality of LEDs or a predetermined criterion, at least a part of the plurality of LEDs in one or more different subsets, wherein each subset comprises at least two different LEDs;
determine for each subset a virtual LED, based on the color characteristics of the LEDs of the subset, assume a predetermined current-ratio of the LEDs of the subset, and replace each subset by the determined virtual LED;
select, from the determined virtual LEDs and any remaining LEDs, one or more sets which meet best the predetermined criterion or a further predetermined criterion; and
determine a set of intensity set points for one or more of the selected sets,
whereby the predetermined criterion comprises a capability of realising a plurality of set points or a subset thereof.

22. The LED driver according to claim 20, wherein the control unit is configured to send a LED control signal for operating at least one switch, wherein each switch is parallel to a different LED unit of the LED fixture, to obtain the desired color.

23. The LED driver according to claim 20, wherein the control unit is configured to send multiple current control signals to the power converter to control the power converter to provide a current value to each LED unit of the subset of the plurality of LEDs, which the current value is different for each LED unit, to obtain the desired color.

24. The LED driver according to claim 20, wherein the control unit is configured to send a current control signal to the power converter to control the power converter to provide the current to the plurality of LEDs of the LED fixture.

25. The LED driver according to claim 20, wherein the control unit comprises a first output control terminal and the power converter comprises a first input control terminal, wherein the first output control terminal is connected to the first input control terminal.

26. The LED driver according to claim 20, wherein the control unit comprises multiple switch control terminals, wherein each switch control terminal is connected to a different switch.

27. The LED driver according to claim 20, wherein the output terminal of the power converter comprises multiple output terminals, wherein each output terminal is connected to a different LED unit of the LED fixture.

28. The LED driver according to claim 22, wherein the LED control signal or a current control signal of the control unit is based on the available color characteristics of the plurality of LEDs and the set point.

29. The LED driver according to claim 20, wherein the control unit comprises a first control terminal, which first control terminal receives a LED characteristic signal, representing the available color characteristics of the plurality of LEDs.

30. The LED driver according to claim 29, wherein the first control terminal of the control unit is connected to a second control terminal or a user interface.

31. The LED driver according to claim 29, wherein the control unit comprises a second input control terminal, which second input control terminal receives the set point.

32. The method according to claim 18, wherein the chromaticity distance, $\Delta E76$, is smaller than 1.

* * * * *